US011869441B2

(12) United States Patent
Seo et al.

(10) Patent No.: US 11,869,441 B2
(45) Date of Patent: Jan. 9, 2024

(54) DISPLAY DEVICE HAVING MULTIPLE DRIVING FREQUENCY MODES

(71) Applicant: Samsung Display Co., Ltd., Yongin-si (KR)

(72) Inventors: Hae-Kwan Seo, Hwaseong-si (KR); Woomi Bae, Daegu (KR); Youngha Sohn, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/866,820

(22) Filed: Jul. 18, 2022

(65) Prior Publication Data

US 2022/0351688 A1 Nov. 3, 2022

Related U.S. Application Data

(63) Continuation of application No. 17/193,127, filed on Mar. 5, 2021, now Pat. No. 11,393,404.

(30) Foreign Application Priority Data

Jun. 30, 2020 (KR) ........................ 10-2020-0080260

(51) Int. Cl.

*G09G 3/3266* (2016.01)
*G09G 3/00* (2006.01)
*G09G 3/3275* (2016.01)

(52) U.S. Cl.

CPC ........... *G09G 3/3266* (2013.01); *G09G 3/035* (2020.08); *G09G 3/3275* (2013.01); *G09G 2330/021* (2013.01)

(58) Field of Classification Search

CPC .................................................... G09G 3/3266
USPC ......................................................... 345/212
See application file for complete search history.

(56) References Cited

U.S. PATENT DOCUMENTS

2016/0035320 A1* 2/2016 Yoon ........................ G09G 3/20 345/213
2016/0111055 A1 4/2016 Na et al.
2016/0351160 A1 12/2016 In et al.
2019/0206329 A1 7/2019 Lee et al.
(Continued)

FOREIGN PATENT DOCUMENTS

KR 1020190083393 A 7/2019
KR 1020200144632 A 12/2020
KR 1020220001555 A 1/2022

*Primary Examiner* — Long D Pham
(74) *Attorney, Agent, or Firm* — CANTOR COLBURN LLP

(57) ABSTRACT

A driving controller divides a display panel into first and second display areas according to an operation mode, outputs a start signal indicating a start of one frame and a masking signal for indicating a start of the second display area, sets a basic driving frequency to a normal frequency when the operation mode is a normal frequency mode, sets the basic driving frequency to a frequency lower than the normal frequency when the operation mode is a multi-frequency mode, and outputs the start signal and the masking signal. The first display area operates at a first driving frequency and the second display area operates at a second driving frequency, and the scan driving circuit sequentially drives scan lines in synchronization with the start signal, and stops, in response to the masking signal, driving of some of the scan lines corresponding to the second display area.

16 Claims, 17 Drawing Sheets

(56) References Cited

U.S. PATENT DOCUMENTS

| | | | |
|---|---|---|---|
| 2020/0243007 | A1 | 7/2020 | Jeon et al. |
| 2020/0402464 | A1 | 12/2020 | Seo et al. |
| 2021/0407352 | A1 | 12/2021 | Seo et al. |

* cited by examiner

DISPLAY DEVICE HAVING MULTIPLE DRIVING FREQUENCY MODES

This application is a continuation of U.S. patent application Ser. No. 17/193,127, filed on Mar. 5, 2021, which claims priority to Korean Patent Application No. 10-2020-0080260, filed on Jun. 30, 2020, and all the benefits accruing therefrom under 35 U.S.C. § 119, the content of which in its entirety is herein incorporated by reference.

BACKGROUND

1. Field

Embodiments of the invention herein relate to a display device, and more particularly, to a multi-frequency drivable display device.

2. Description of the Related Art

An organic light emitting display device among display devices displays an image using an organic light emitting diode for emitting light by recombination of electrons and holes. The organic light emitting display device has advantages such as fast response speed and low power consumption.

The organic light emitting display device is provided with pixels connected to data lines and scan lines. Typically, each of the pixels includes an organic light emitting diode and a circuit unit for controlling a current amount flowing through the organic light emitting diode. In response to a data signal, the circuit unit controls the current amount flowing from a first driving voltage to a second driving voltage via the organic light emitting diode. Here, light of a predetermined luminance is generated in response to the current amount flowing through the organic light emitting diode.

SUMMARY

In a case of displaying a moving image on a display device, as a driving frequency becomes higher, a display quality may be improved. However, for a display device operating at a high driving frequency, power consumption increases.

Embodiments of the invention provide a display device capable of reducing power consumption.

An embodiment of the invention provides a display device including a display panel including a plurality of pixels respectively connected to a plurality of data lines and a plurality of scan lines, a data driving circuit which drives the plurality of data lines, a scan driving circuit which drives the plurality of scan lines, and a driving controller which receives an image signal and a control signal, controls the data driving circuit and the scan driving circuit according to an operation mode, divides the display panel into a first display area and a second display area according to the operation mode, outputs a start signal indicating a start of one frame and a masking signal for indicating a start of the second display area, sets a basic driving frequency to a normal frequency when the operation mode is a normal frequency mode, sets the basic driving frequency to a frequency lower than the normal frequency and outputs the start signal and the masking signal so that the first display area operates at a first driving frequency and the second display area operates at a second driving frequency lower than the first driving frequency when the operation mode is a multi-frequency mode. The scan driving circuit sequentially drives the plurality of scan lines in synchronization with the start signal, and stops, in response to the masking signal, driving of scan lines corresponding to the second display area among the plurality of scan lines.

In an embodiment, the first driving frequency may be higher than the basic driving frequency of the multi-frequency mode, and the second driving frequency may be lower than the basic driving frequency of the multi-frequency mode.

In an embodiment, during the multi-frequency mode, a first frame may have a first duration, a second frame consecutive to the first frame has a second duration, and the second duration may be shorter than the first duration.

In an embodiment, during the multi-frequency mode, the first duration of the first frame may be longer than the first duration of the first frame during the normal frequency mode.

In an embodiment, the driving controller may provide image data signals corresponding to the first display area and the second display area to the data driving circuit during the first frame of the multi-frequency mode, and provide an image data signal corresponding to the first display area to the data driving circuit during the second frame of the multi-frequency mode.

In an embodiment, the driving controller may provide image data signals corresponding to the first display area and the second display area to the data driving circuit in every frame during the normal frequency mode.

In an embodiment, the scan driving circuit may include a plurality of driving stages which respectively drives corresponding scan lines among the plurality of scan lines, where each of the plurality of driving stages includes a driving circuit which outputs a first scan signal to a first output terminal in response to clock signals from the driving controller and a carry signal, and a masking circuit which stops the driving circuit to output the first scan signal in response to the masking signal.

In an embodiment, a first driving stage among the plurality of driving stages may receive the start signal as the carry signal.

In an embodiment, the driving circuit may output a second scan signal to a second output terminal in response to the clock signals and the carry signal.

In an embodiment, among the plurality of driving stages, the second scan signal output from a j-th driving stage may be provided to a (j+k)-th driving stage as the carry signal, where j and k are respectively natural numbers.

In an embodiment, the masking signal may include a first masking signal and a second masking signal, where the masking circuit includes a first masking circuit which electrically connects a first voltage terminal and the first output terminal in response to the first masking signal, and a third masking circuit which electrically connects the first output terminal and the second output terminal in response to the second masking signal.

In an embodiment, during the multi-frequency mode, the first masking circuit may electrically connect the first voltage terminal and the first output terminal in response to the first masking signal, and during the multi-frequency mode, the second masking circuit may electrically disconnect the first output terminal and the second output terminal in response to the second masking signal, In an embodiment of the invention, a display device includes a display panel in which a first non-folding area, a folding area, and a second non-folding area are defined in a plan view, and which includes a plurality of pixels respectively connected to a plurality of data lines and a plurality of scan lines, a data driving circuit which drives the plurality of data lines, a scan driving circuit which drives the plurality of scan lines, and a driving controller which receives an image signal and a control signal, controls the data driving circuit and the scan driving circuit according to an operation mode, divides the display panel into a first display area and a second display area according to the operation mode, outputs a start signal indicating a start of one frame and a masking signal for indicating a start of the second display area, sets a basic driving frequency to a normal frequency when the operation mode is a normal frequency mode, sets the basic driving frequency to a frequency lower than the normal frequency and outputs the start signal and the masking signal so that the first display area operates at a first driving frequency and the second display area operates at a second driving frequency lower than the first driving frequency when the operation mode is a multi-frequency mode. The scan driving circuit sequentially drives the plurality of scan lines in synchronization with the start signal, and stops, in response to the masking signal, driving of scan lines corresponding to the second display area among the plurality of scan lines.

In an embodiment, the first driving frequency may be higher than the basic driving frequency of the multi-frequency mode, and the second driving frequency may be lower than the basic driving frequency of the multi-frequency mode.

In an embodiment, during the multi-frequency mode, a first frame may have a first duration, a second frame consecutive to the first frame has a second duration, and the second duration may be shorter than the first duration.

In an embodiment, during the multi-frequency mode, the image data signal to be provided to the first display area may be a moving image signal, and the image data signal to be provided to the second display area may be a still image signal.

In an embodiment, the display panel may be folded with reference to a folding axis extending along a predetermined direction in the folding area.

In an embodiment, the scan driving circuit may include a plurality of driving stages respectively which drives corresponding scan lines among the plurality of scan lines, where each of the plurality of driving stages include a driving circuit which outputs a first scan signal to a first output terminal and output a second scan signal to a second output terminal in response to clock signals from the driving controller and a carry signal, and a masking circuit which stops the driving circuit to output the first scan signal in response to the masking signal.

In an embodiment, a first driving stage among the plurality of driving stages may receive the start signal as the carry signal.

In an embodiment, the masking signal may include a first masking signal and a second masking signal, where the masking circuit includes a first masking circuit which electrically connects a first voltage terminal and the first output terminal in response to the first masking signal, and a third masking circuit which electrically connects the first output terminal and the second output terminal in response to the second masking signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
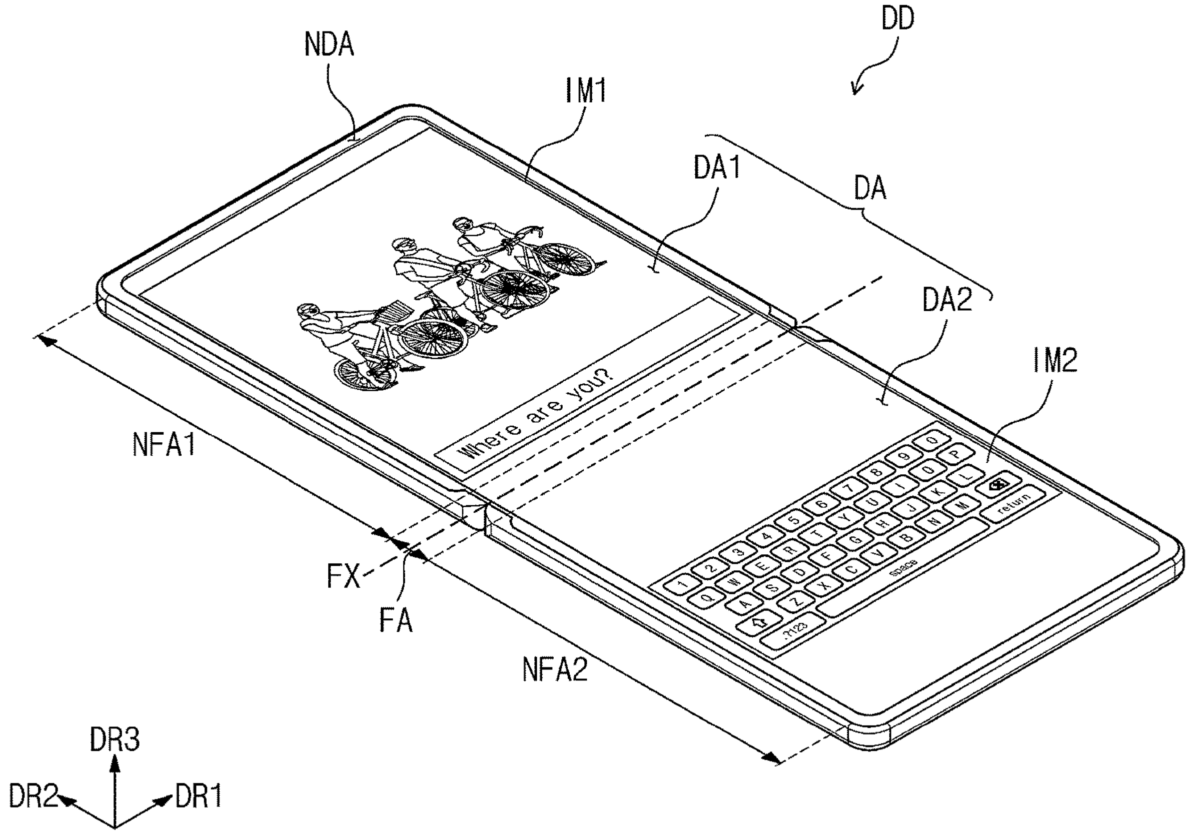
FIG. 1A is a perspective view of an embodiment of a display device according to the invention.

It will be understood that when an element or layer is referred to as being "on", "to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents. The term "and/or" includes any and all combinations of one or more of the associated items.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the disclosure. As used herein, the singular forms "a," "an," and "the" may be intended to include the plural forms as well, unless the context clearly indicates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the drawing figures.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the invention will be described with reference to the accompanying drawings.

Figure 1B:
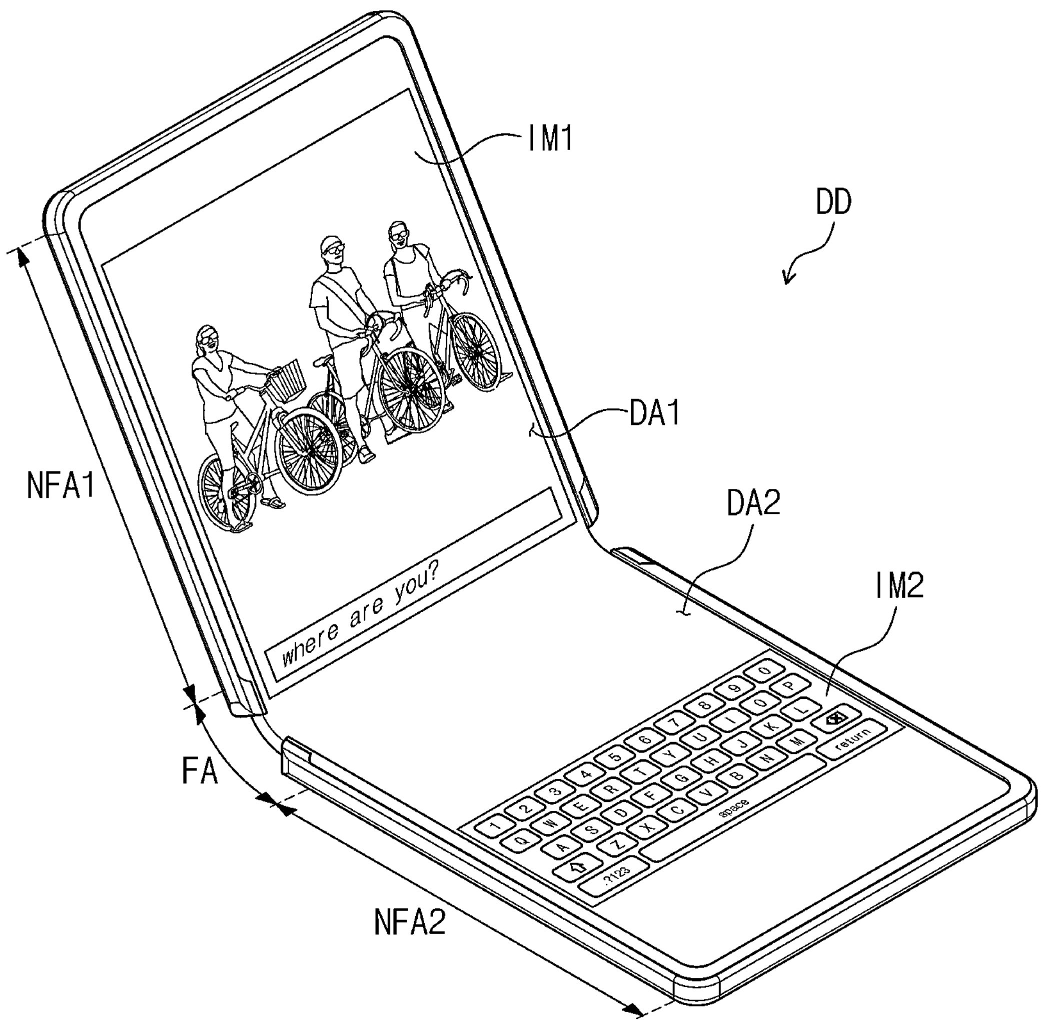
FIG. 1B is a perspective view of an embodiment of a display device according to the invention.

FIG. 1A is a perspective view of an embodiment of a display device according to the invention. FIG. 1B is a perspective view of an embodiment of a display device according to the invention. FIG. 1A illustrates the display device DD in an unfolded state, and FIG. 1B illustrates the display device DD in a folded state.

FIGS. 1A and 1B exemplarily illustrate the display device DD is a mobile phone. However, the invention is not limited thereto. The display device DD may include a tablet personal computer ("PC"), a smartphone, a personal digital assistant ("PDA"), a portable multimedia player ("PMP"), a game machine, a wristwatch type electronic apparatus, or the like. Embodiments of the invention may be used not only in large-sized electronic equipment such as television or an outdoor billboard, but also in medium or small-sized electronic equipment such as a personal computer, a notebook computer, a kiosk, a vehicle navigation unit, or a camera. These are only enumerated as an embodiment, and the display device DD may also be employed in other electronic devices without being deviated from the inventive concept.

The display device DD may include a display area DA and a non-display area NDA. The display device DD may display an image through a display area DA. When the display device DD is in an unfolded state, the display area DA may include a plane defined by a first direction DR1 and a second direction DR2. The thickness direction of the display device DD may be parallel to a third direction DR3 that intersects with the first direction DR1 and the second direction DR2. Accordingly, the front surfaces (or top surfaces) and the rear surfaces (or bottom surfaces) of the members composing the display device DD may be defined with reference to the third direction DR3. The non-display area NDA may be also referred to as a bezel area. In an embodiment, the display area DA may be a quadrangular shape. The non-display area NDA may surround the display area DA, for example.

The display area DA may include a first non-folding area NFA1, a folding area FA, and a second non-folding area NFA2. The folding area FA may be folded with reference to a folding axis FX extending along the first direction DR1.

When the display device DD is folded, the first non-folding area NFA1 and the second non-folding area NFA2 may face each other. Accordingly, in a completely folded state, the display area DA may not be exposed to the outside, and this may be referred to as in-folding. However, the operation of the display device DD is not limited thereto.

In an embodiment of the invention, when the display device DD is folded, the first non-folding area NFA1 and the second non-folding area NFA2 may oppose to each other, for example. Accordingly, in a completely folded state, the first non-folding area NFA1 may be exposed to the outside, and this may be referred to as out-folding.

For the display device DD, either the in-folding operation or the out-folding operation is possible. In an alternative embodiment, both the in-folding and out-folding operations are possible to the display device DD. In this case, the same area of the display device DD may be in-folded or out-folded. In an alternative embodiment, some area of the display device DD may be in-folded and another area may be out-folded.

FIGS. 1A and 1B exemplarily illustrate one folding area and two non-folding areas, but the numbers of the folding areas and the non-folding areas are not limited thereto. In an embodiment, the display device DD may include a plurality of non-folding areas greater than two and a plurality of folding areas arranged between the adjacent non-folding areas, for example.

FIGS. 1A and 1B exemplarily illustrate that the folding axis FX is parallel to the short axis of the display device DD, but the invention is not limited thereto. In an embodiment, the folding axis may extend along the long axis of the display device DD, for example, along a direction parallel to the second direction DR2, for example. In this case, the first non-folding area NFA1, the folding area FA, and the second non-folding area NFA2 may be sequentially arranged along the first direction DR1.

A plurality of display areas DA1 and DA2 may be defined in the display area DA of the display device DD. In FIG. 1A, two display areas DA1 and DA2 are exemplarily illustrated, but the number of the plurality of display areas DA1 and DA2 is not limited thereto.

The plurality of display areas DA1 and DA2 may include a first display area DA1 and a second display area DA2. In an embodiment, the first display area DA1 may be an area in which a first image IM1 is displayed, and the second display area DA2 may be an area in which a second image IM2 is displayed, for example, but the invention is not limited thereto. In an embodiment, the first image IM1 is a moving image, and the second image IM2 may be a still image or an image (text information or the like) having a long change period, for example.

The display device DD in an embodiment may operate differently according to an operation mode. The operation mode may include a normal frequency mode and a multi-frequency mode. The display device DD sets a basic driving frequency (BDF) to a normal frequency (NF) during the normal frequency mode. Accordingly, both of the first display area DA1 and the second display area DA2 may be driven at the normal frequency (NF). The display device DD in an embodiment may set the basic driving frequency (BDF) to a frequency lower than the normal frequency (NF) (NF>BDF) during the multi-frequency mode. During the multi-frequency mode, the display device DD may drive the first display area DA1 on which the first image IM1 is displayed at a first driving frequency, and the second display area DA2 on which a second image IM2 is displayed at a second driving frequency. In an embodiment, the first driving frequency (DF1) is higher than the basic driving frequency (BDF) (DF1>BDF), and the second driving frequency (DF2) is lower than the basic driving frequency (BDF) (DF2<BDF). The first driving frequency (DF1) may be higher than the second driving frequency (DF2) (DF1>DF2). In an embodiment, the first driving frequency (DF1) may be higher than the normal frequency (NF) (DF1>NF>BDF).

Each size of the first display area DA1 and the second display area DA2 may be preset, and may be changed by an application program. In an embodiment, the first display area DA1 may correspond to a first non-folding area NFA1, and the second display area DA2 may correspond to a second non-folding area NFA2. In addition, a portion of the folding area FA may correspond to the first display area DA1, and the other portion of the folding area FA may correspond to the second display area DA2.

In an embodiment, the first display area DA1 may correspond to one portion of the first non-folding area NFA1, and the second display area DA2 may correspond to the other portion of the first non-folding area NFA1, the folding area FA, and the second non-folding area NFA2. In other words, the area of the first display area DA1 may be greater than that of the second display area DA2.

In an embodiment, the first display area DA1 may correspond to the first non-folding area NFA1, the folding area FA, and a portion of the second non-folding area NFA2, and the second display area DA2 may be another portion of the second non-folding area NFA2. In other words, the area of the second display area DA2 may be greater than that of the first display area DA1.

As illustrated in FIG. 1B, in a state where the first folding area FA is folded, the first display area DA1 may correspond to the first non-folding area NFA1, and the second display area DA2 may correspond to the folding area FA and the second non-folding area NFA2.

FIGS. 1A and 1B illustrate the foldable display device DD as an example of a display device, but the invention is not limited thereto. In an embodiment, the inventive concept may also be applied to an unfolded display device, a display device with two or more folding areas, a rollable display device, or the like, for example.

Figure 2:
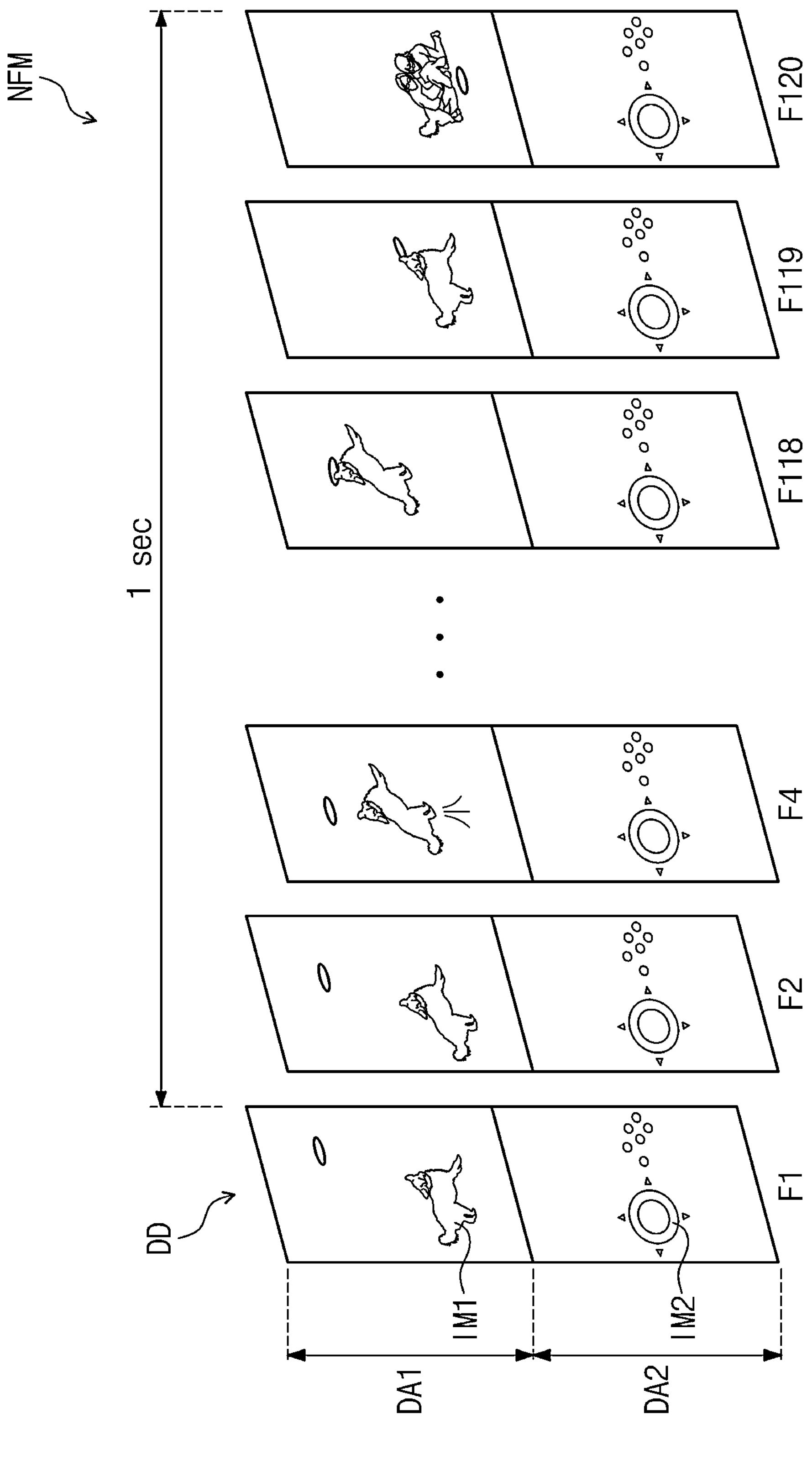
FIG. 2 is drawing for explaining an embodiment of an operation of a display device in a normal frequency mode.
Figure 3:
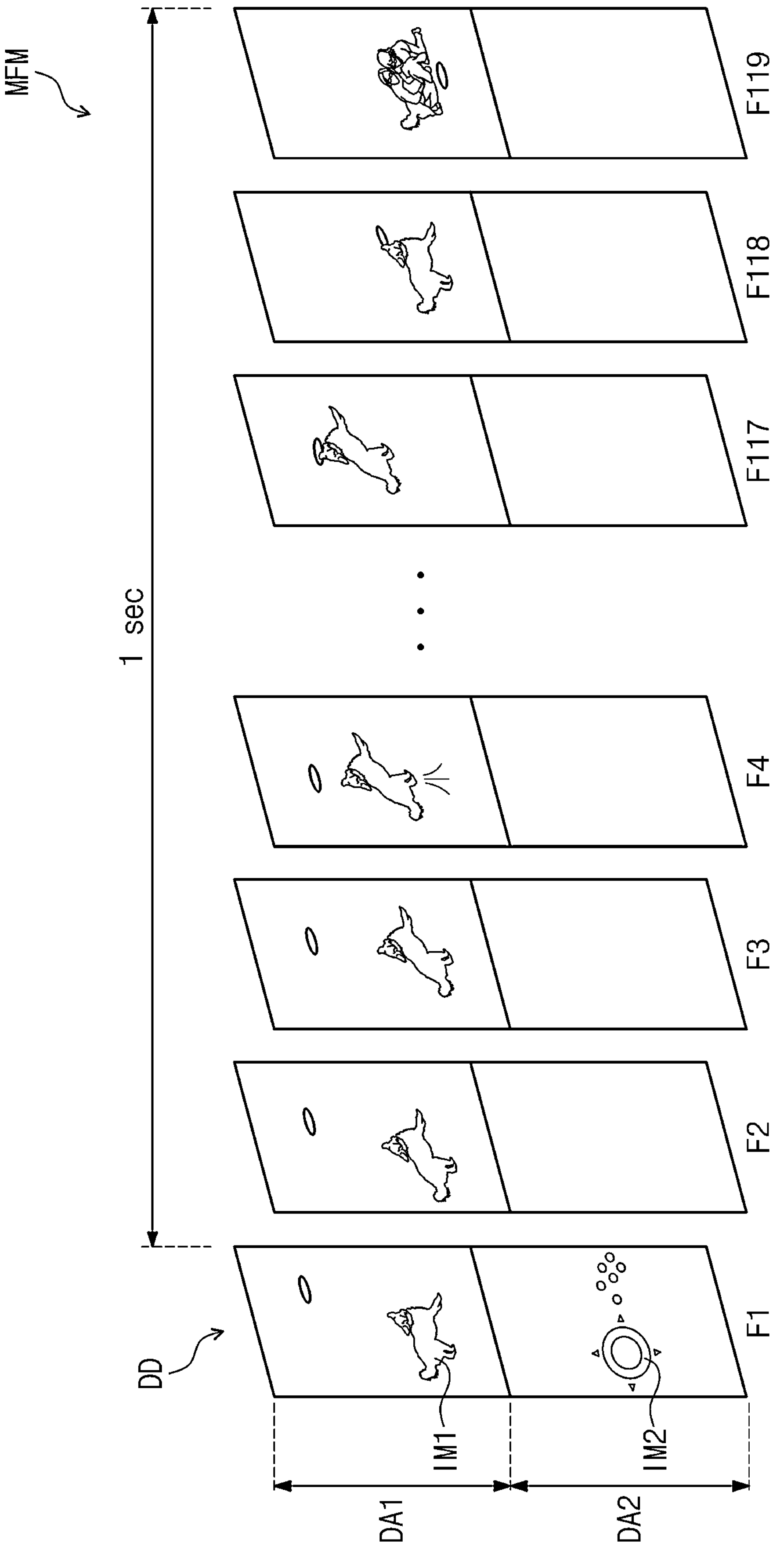
FIG. 3 is drawing for explaining an embodiment of an operation of a display device in a multi-frequency mode.

FIG. 2 is drawing for explaining an embodiment of an operation of a display device in the normal frequency mode. FIG. 3 is drawing for explaining an operation of a display device in the multi-frequency mode.

Referring to FIG. 2, in the normal frequency mode NFM, the driving frequencies of the first display area DA1 and the second display area DA2 of the display device DD are the normal frequency. In an embodiment, the normal frequency may be 120 hertz (Hz), for example. In the normal frequency mode NFM, images of a first frame F1 to a 120-th frame F120 may be displayed on the first display area DA1 and the second display area DA2 for 1 second, for example.

Referring to FIG. 3, in the multi-frequency mode ("MFM"), the driving frequency of the first display area DA1 of the display device DD may be a first driving frequency lower than the normal frequency, and the driving frequency of the second display area DA2 may be a second driving frequency lower than the normal frequency. When the normal frequency is 120 Hz, the first driving frequency and the second frequency are as the following Table 1.

TABLE 1

| First driving frequency | Second driving frequency |
|---|---|
| 80 Hz | 40 Hz |
| 90 Hz | 30 Hz |
| 102 Hz | 18 Hz |
| 110 Hz | 10 Hz |
| 118 Hz | 2 Hz |
| 119 Hz | 1 Hz |

In an embodiment, as illustrated in FIG. 3, when the first driving frequency in the multi-frequency mode MFM is 119 hertz (Hz), and the second driving frequency is 1 hertz (Hz), for one second, the first image IM1 is displayed from the first frame F1 to a 119-th frame F119 on the first display area DA1, and the second image IM2 is displayed only in the first frame F1 on the second display area DA2, for example. In other words, in the multi-frequency mode MFM, for one second, the first image IM1 corresponding to the 119 frames is displayed on the first display area DA1, and the second image IM2 corresponding to the first frame F1 is displayed on the second display area DA2. In the multi-frequency mode MFM, no image is displayed on the second display area DA2, and thus the power consumption may be reduced. In addition, in the multi-frequency mode MFM, the image of the first driving frequency of 119 Hz close to the normal frequency is displayed, and thus the degradation in the display quality of the display device DD may be minimized and the power consumption may also be reduced.

Figure 4:
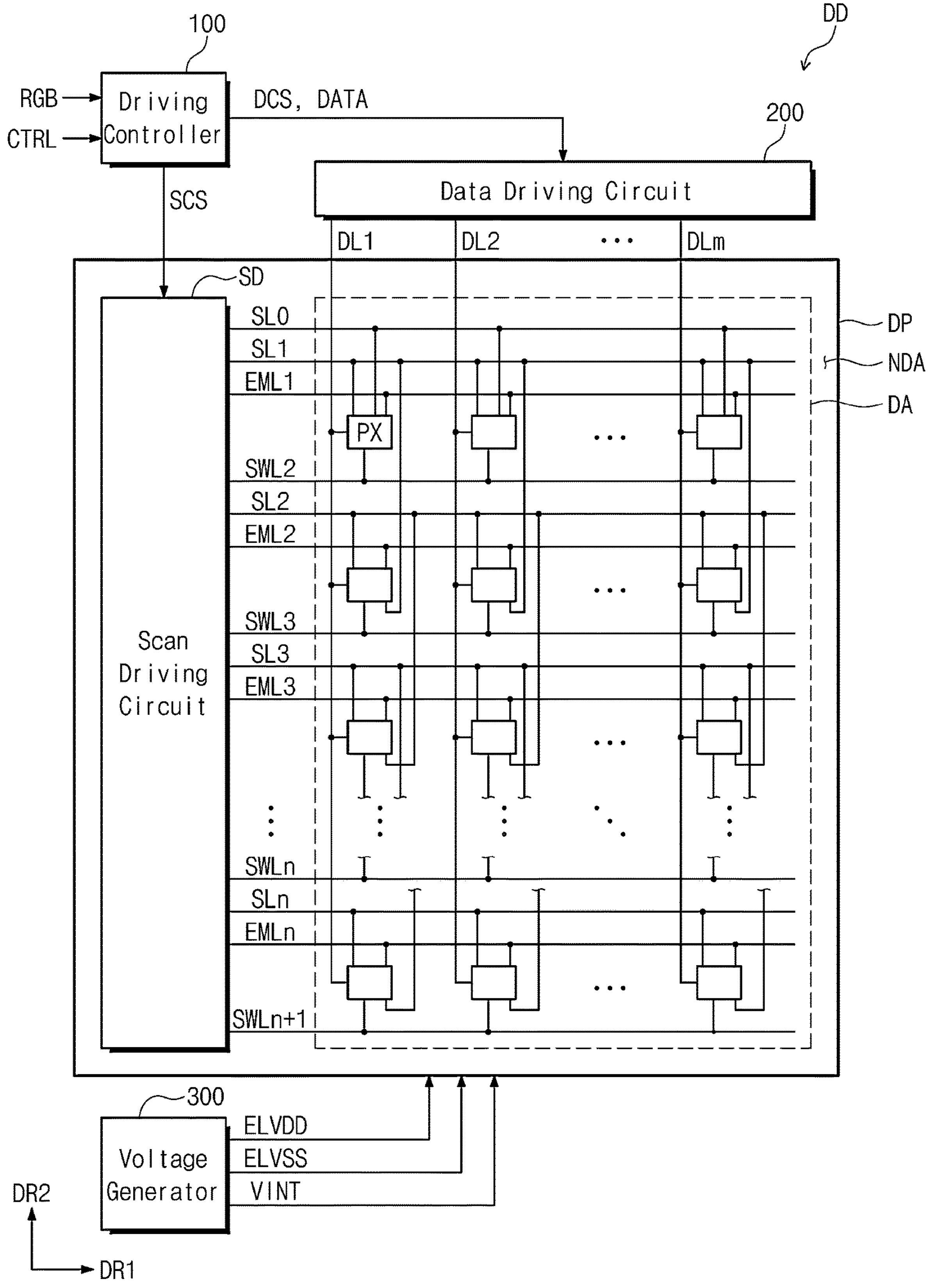
FIG. 4 is a block diagram of an embodiment of a display device according to the invention.

FIG. 4 is a block diagram of an embodiment of a display device according to the invention.

Referring to FIG. 4, the display device DD includes a display panel DP, a driving controller 100, a data driving circuit 200, and a voltage generator 300.

The driving controller 100 receives an image signal RGB and a control signal CTRL. The driving controller 100 generates image data signal DATA of which data format is converted so as to be matched with the specification of an interface with the data driving circuit 200. The driving controller 100 outputs a scan control signal SCS and a data control signal DCS.

The data driving circuit 200 receives the data control signal DCS and the image data signal DATA from the driving controller 100. The data driving circuit 200 converts the image data signal DATA into data signals, and outputs the data signals to a plurality of data lines DL1 to DLm (m is a natural number) to be described later. The data signals are analog voltages corresponding to a grayscale value of the image data signal DATA.

The voltage generator 300 generates voltages desired for the operation of the display panel DP. In the embodiment, the voltage generator 300 generates a first driving voltage ELVDD, a second driving voltage ELVSS, and an initialization voltage VINT.

The display panel DP includes first scan lines SL0 to SLn (n is a natural number), second scan lines SWL2 to SWLn+1, light emission control lines EML1 to EMLn, data lines DL1 to DLm, and pixels PX. The display panel DP may further include a scan driving circuit SD. In an embodiment, the scan driving circuit SD is arranged in a first side of the display panel DP. The first scan lines SL0 to SLn, the second scan lines SWL2 to SWLn+1, and light emission control lines EML1 to EMLn extend in the first direction DR1 from the scan driving circuit SD.

The first scan lines SL0 to SLn, the second scan lines SWL2 to SWLn+1, and the light emission control lines EML1 to EMLn are arranged in the second direction DR2 to be spaced apart from each other. The data lines DL1 to DLm extend from the data driving circuit 200 in the opposite direction (e.g., lower direction in FIG. 4) to the second direction DR2 (e.g., upper direction indicated by an arrow in FIG. 4), and are arranged in the first direction DR1 to be spaced apart from each other.

The plurality of pixels PX are electrically connected to the first scan lines SL0 to SLn, the second scan lines SWL2 to SWLn+1, the light emission control lines EML1 to EMLn, and the data lines DL1 to DLm. Each of the plurality of pixels PX may be electrically connected to four scan lines. In an embodiment, as shown in FIG. 2, the pixels in a first row may be connected to the scan lines SL0, SL1, SWL2, and EML1, for example. In addition, the pixels in a second row may be connected to the scan lines SL2, SWL3, and EML2.

Each of the plurality of pixels PX includes an organic light emitting diode ED (refer to FIG. 5), and a pixel circuit unit PXC (refer to FIG. 5) for controlling the emission of the light emitting diode ED. The pixel circuit unit PXC may include a plurality of transistors and a capacitor. The scan driving circuit SD may include transistors formed through the same process as the pixel circuit unit PXC.

Each of the plurality of pixels PX receives the first driving voltage ELVDD, the second driving voltage ELVSS, and the initialization voltage VINT.

The scan driving circuit SD receives the scan control signal SCS from the driving controller 100. The scan driving circuit SD may output first scan signals to the first scan lines SL0 to SLn, and second scan signals to the second scan lines SWL2 to SWLn+1 in response to the scan control signal SCS. The circuit configuration and operation of the scan driving circuit SD will be described later in detail.

In the example shown in FIG. 4, the scan driving circuit SD may output light emission control signals to the light emission control lines EML1 to EMLn. In another embodiment, the display device DD may further include a light emission driving circuit for generating the light emission control signals. In this case, the scan driving circuit SD may output the first scan signals to be provided to the first scan lines SL0 to SLn and the second scan signals to be provided to the second scan lines SWL2 to SWLn+1, and the light emission driving circuit may output the light emission control signals to be provided to the light emission control lines EML1 to EMLn.

The driving controller 100 in an embodiment divides the display panel DP into the first display area DA1 (refer to FIG. 1) and the second display area DA2 (refer to FIG. 1) based on the image signal RGB, and outputs at least one masking signal indicating the start of the second display area DA2. The at least one masking signal may be included in the scan control signal SCS.

Figure 5:
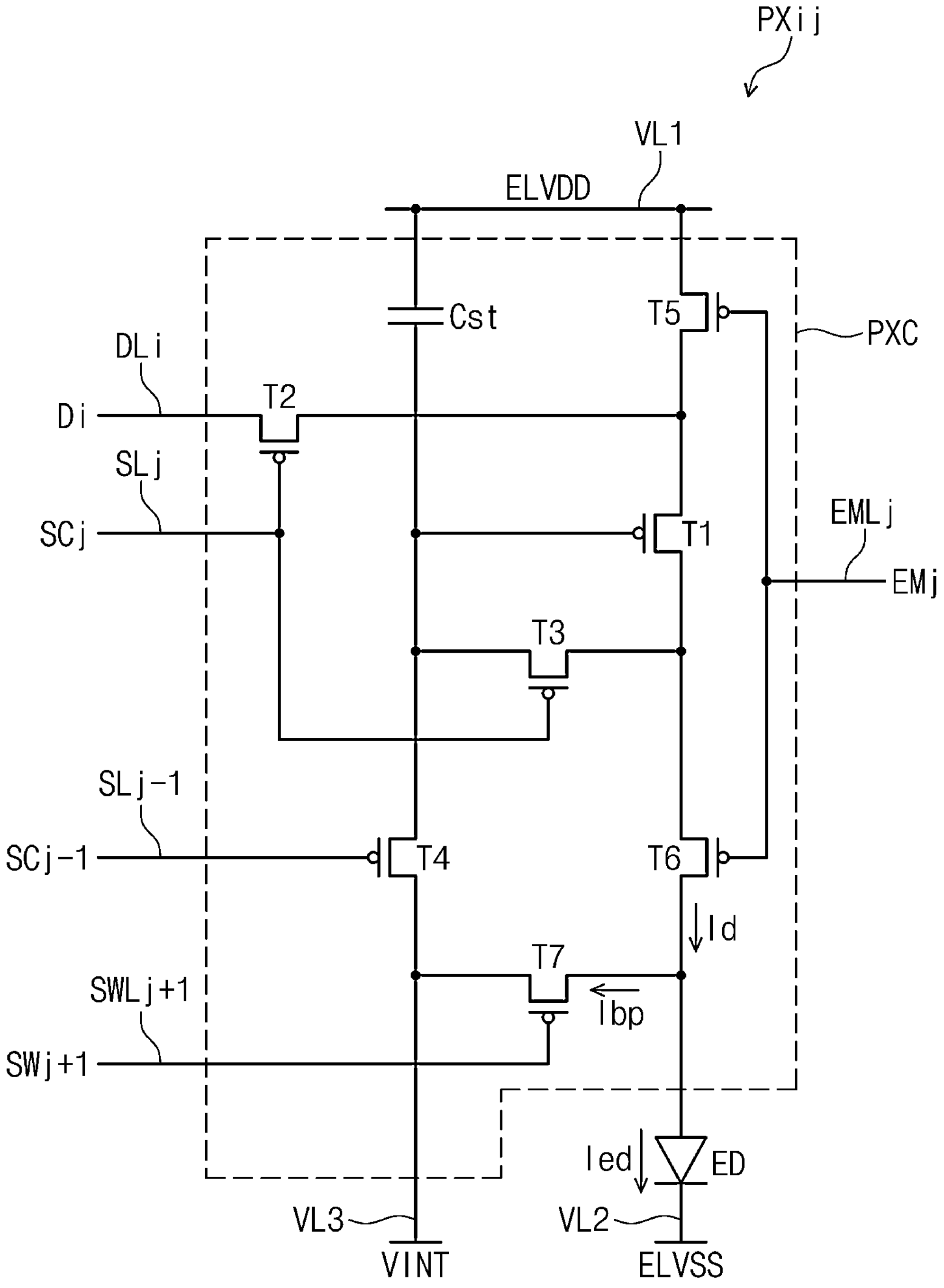
FIG. 5 is an equivalent circuit diagram of an embodiment of a pixel according to the invention.

FIG. 5 is an equivalent circuit diagram of an embodiment of a pixel according to the invention.

FIG. 5 exemplarily illustrates the equivalent circuit diagram of a pixel PXij (i and j are natural numbers) connected to an i-th data line DLi among the data lines DL1 to DLm shown in FIG. 4, a (j−1)-th first scan line SLj−1 and a j-th first scan line SLj among the first scan lines SL0 to SLn, a (j+1)-th second scan line SWLj+1 among the second scan lines SWL2 to SWLn+1, and a j-th light emission control line EMLj among the light emission control lines EML1 to EMLn.

Each of the plurality of pixels PX shown in FIG. 4 may have the same circuit configuration as the equivalent circuit diagram of the pixel PXij shown in FIG. 5. In the embodiment, the pixel circuit unit PXC of the pixel PXij includes first to seventh transistors T1 to T7 and one capacitor Cst. In addition, each of the first to seventh transistors T1 to T7 is a p-type transistor having a low-temperature polycrystalline silicon ("LTPS") semiconductor layer. However, the invention is not limited thereto, and the first to seventh transistors T1 to T7 may be an n-type transistor with an oxide semiconductor taken as the semiconductor layer. In an embodiment, at least one of the first to seventh transistors T1 to T7 may be an n-type transistor and the rest may be p-type transistors. In addition, the circuit configuration of the pixel in an embodiment of the invention is not limited to FIG. 5. The configuration of the pixel circuit unit PXC may be modified and practiced.

With reference to FIG. 5, the pixel PXij of the display device in an embodiment includes the first to seventh transistors T1, T2, T3, T4, T5, T6 and T7, the capacitor Cst, and at least one light emitting diode ED. The embodiment explains an example in which one pixel PXij includes one light emitting diode ED.

The (j−1)-th first scan line SLj−1, the j-th first scan line SLj, the (j+1)-th second scan line SWLj+1, and the j-th light emission control line EMLj may respectively deliver a (j−1)-th first scan signal SCj−1, a j-th first scan signal SCj, a (j+1)-th second scan signal SWj+1, and a j-th light emission control signal EMj. The i-th data line DLi delivers a data signal Di. The data signal Di may have a voltage level corresponding to the image signal RGB input to the display device DD (refer to FIG. 4). The first to third driving voltage lines VL1, VL2, and VL3 may respectively deliver the first driving voltage ELVDD, the second driving voltage ELVSS, and the initialization voltage VINT.

The first transistor T1 includes a first electrode connected to the first driving voltage line VL1 via the fifth transistor T5, a second electrode electrically connected to the anode of the light emitting diode ED via the sixth transistor T6, and a gate electrode connected to one end of the capacitor Cst. The first transistor T1 receives the data signal Di delivered through the data line DLi according to a switching operation of the second transistor T2, and provides a driving current Id to the light emitting diode ED.

The second transistor T2 includes a first electrode connected to the data line DLi, a second electrode connected to the first electrode of the first transistor T1, and a gate electrode connected to the j-th first scan line SLj. The second transistor T2 may be turned on according to the j-th first scan signal SCj delivered through the j-th first scan line SLj, and deliver the data signal Di delivered from the data line DLi to the first electrode of the first transistor T1.

The third transistor T3 includes a first electrode connected to the gate electrode of the first transistor T1, a second electrode connected to the second electrode of the first transistor T1, and a gate electrode connected to the j-th first scan line SLj. The third transistor T3 may be turned on according to the j-th first scan signal SCj delivered through the j-th first scan line SLj, and connect the gate electrode and the second electrode of the first transistor T1 to diode-connect the first transistor T1.

The fourth transistor T4 includes a first electrode connected to the gate electrode of the first transistor T1, a second electrode connected to the third driving voltage line VL3 through which the initialization voltage VINT is delivered, and a gate electrode connected to the j-th first scan line SLj. The fourth transistor T4 may be turned on according to the (j−1)-th first scan signal SCj−1 delivered through the (j−1)-th first scan line SLj−1, and delivers the initialization voltage VINT to the gate electrode of the first transistor T1 to perform an initialization operation for initializing a voltage of the gate electrode of the first transistor T1.

The fifth transistor T5 includes a first electrode connected to the first driving voltage line VL1, a second electrode connected to the first electrode of the first transistor T1, and a gate electrode connected to the j-th light emission control line EMLj.

The sixth transistor T6 includes a first electrode connected to the second electrode of the first transistor T1, a second electrode connected to the anode of the light emitting diode ED, and a gate electrode connected to the j-th light emission control line EMLj.

The fifth transistor T5 and the sixth transistor T6 may be substantially simultaneously turned on according to the j-th light emission control signal EMj delivered through the j-th light emission control line EMLj, and through this, the first driving voltage ELVDD is compensated through the diode-connected first transistor T1 to be delivered to the light emitting diode ED.

The seventh transistor T7 includes a first electrode connected to the second electrode of the fourth transistor T4, a second electrode connected to the second electrode of the sixth transistor T6, and a gate electrode connected to the (j+1)-th second scan line SWLj+1.

As the foregoing, one end of the capacitor Cst is connected to the gate electrode of the first transistor T1, and the other end is connected to the first driving voltage line VL1. The cathode of the light emitting diode ED may be connected to the second driving voltage line VL2 for delivering the second driving voltage ELVSS. The structure of the pixel PXij in an embodiment is not limited to the structure shown in FIG. 5, and the numbers of transistors and the capacitors included in one pixel and the connection relationship thereof may be modified in various ways.

Figure 6:
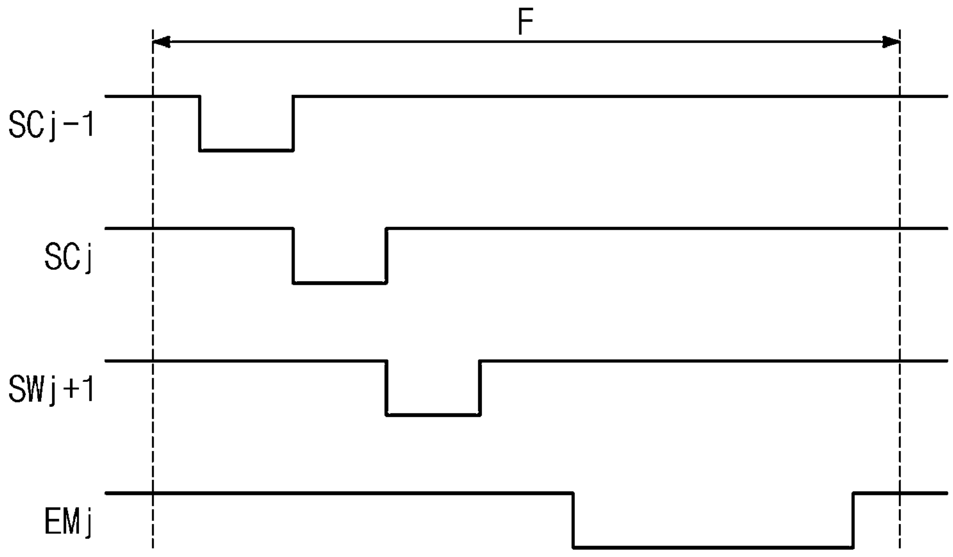
FIG. 6 is a timing diagram for explaining the operation of a pixel of the display device of FIG. 3.

FIG. 6 is a timing diagram for explaining an embodiment of the operation of a pixel of the display device of FIG. 5. The operation of the display device in an embodiment will be described with reference to FIGS. 5 and 6.

With reference to FIGS. 5 and 6, during an initialization period within one frame F, the (j−1)-th first scan signal SCj−1 of a low level is provided through the (j−1)-th first scan line SLj−1. The fourth transistor T4 is turned on in response the (j−1)-th first scan signal SCj−1 of the low level, and the initialization voltage VINT is delivered to the gate electrode of the first transistor T1 through the fourth transistor T4 to initialize the first transistor T1.

Next, during a data programming and a compensation period, when the j-th first scan signal SCj of a low level is provided through the j-th first scan line SLj, the third transistor T3 is turned on. The first transistor T1 is diode-connected by the turned-on third transistor T3 and is biased in a forward direction. In addition, the second transistor T2 is turned on by the j-th first scan signal SCj of the low level. Then, a compensation voltage, which is reduced by a threshold voltage of the first transistor T1 from the data signal Di provided from the data line DLi, is applied to the gate electrode of the first transistor T1. In other words, the gate voltage applied to the gate electrode of the first transistor T1 may be the compensation voltage.

The first driving voltage ELVDD and the compensation voltage are applied to the both ends of the capacitor Cst, and charges corresponding to the voltage difference between the both ends may be stored in the capacitor Cst.

The seventh transistor T7 receives a (j+1)-th second scan signal SWj+1 of a low level through the (j+1)-th second scan line SWLj+1 to be turned on. A portion of the driving current Id may leak through the seventh transistor T7 as a bypass current Ibp by the seventh transistor T7.

Even when a minimum current of the first transistor T1, which displays a black mage, flows as the driving current Id, the black image may not be properly displayed when the light emitting diode ED emits light. Accordingly, as the bypass current Ibp, the seventh transistor T7 in the pixel PXij in an embodiment of the invention may disperse a portion of the minimum current of the first transistor T1 to current paths other than a current path of an organic light emitting diode side. Here, the minimum current of the first transistor T1 means a current under a condition that a gate-source voltage of the first transistor T1 is smaller than the threshold voltage to turn off the first transistor T1. In this way, under the condition of turning off the first transistor T1, the minimum driving current (for example, the current of 10 picoampere (pA) or smaller) is delivered to the light emitting diode ED to be represented as a black luminance image. When the minimum driving current for displaying the black image flows, a bypassing influence of the bypass current Ibp is large. However, when a large driving current for displaying an image such as a typical image or a white image flows, there is little influence of the bypass current Ibp. Accordingly, when the driving current for displaying the black image flows, the light emission current led of the light emitting diode ED, which is reduced by a current amount of the bypass current Ibp that leaks through the seventh transistor T7 from the driving current Id, has a minimum current amount that is desired for reliably representing the black image. Accordingly, the contrast ratio may be improved by implementing the accurate black luminance image using the seventh transistor T7. In this embodiment, a bypass signal is the (j+1)-th second scan signal SWj+1 of the low level, but is not limited thereto.

Next, during the light emission period, the j-th light emission control signal EMj supplied from the j-th light emission control line EMLj is changed from a high level to a low level. During the light emission period, the fifth transistor T5 and the sixth transistor T6 are turned on by the j-th light emission control signal EMj. Then, the driving current Id is generated according to the voltage difference between the gate voltage of the gate electrode of the first transistor T1 and the first driving voltage ELVDD, the driving current Id is supplied to the light emitting diode ED through the sixth transistor T6, and then the light emission current led flows to the light emitting diode ED.

Figure 7:
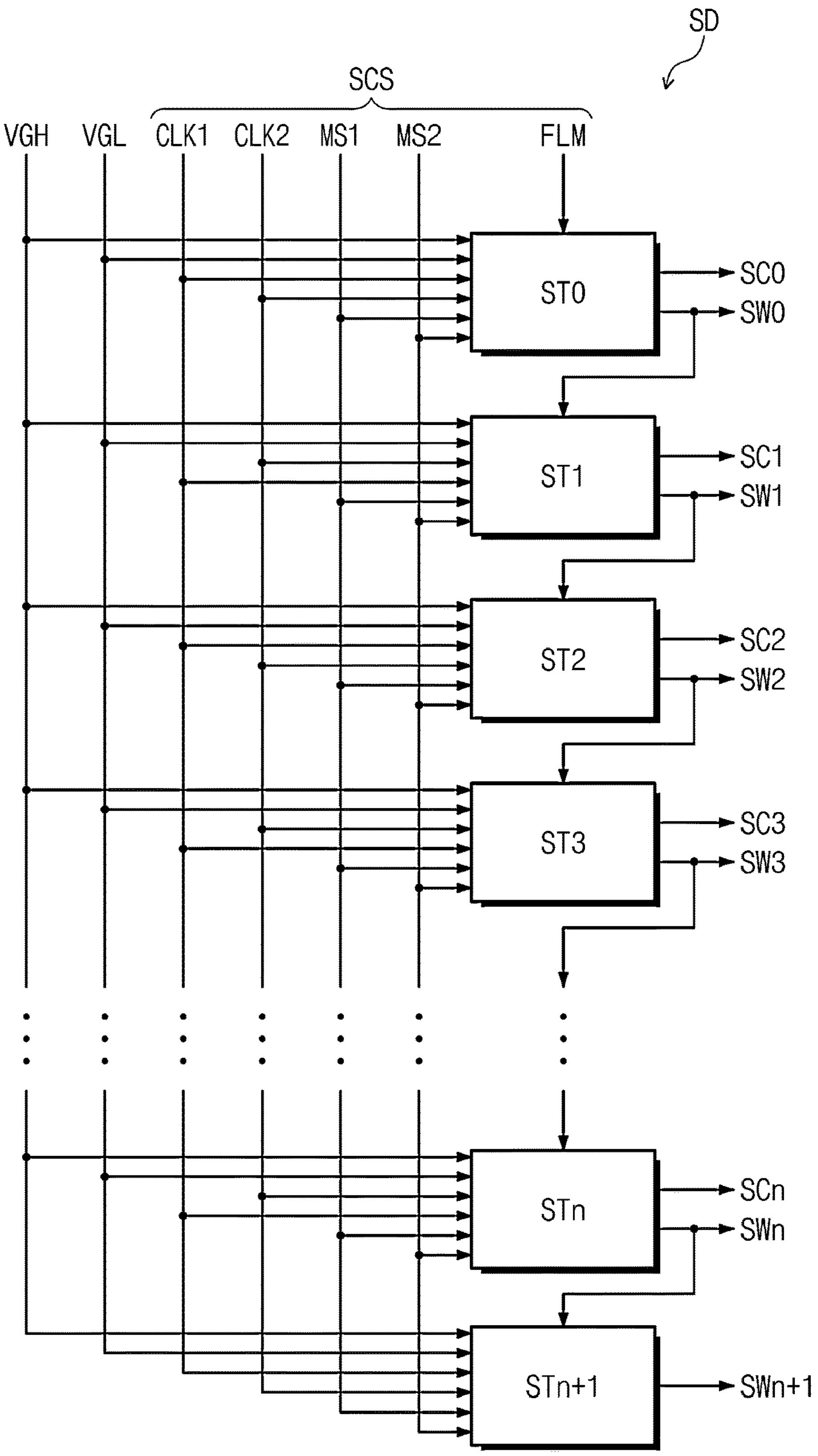
FIG. 7 is a block diagram of an embodiment of a scan driving circuit SD according to the invention.

FIG. 7 is a block diagram of an embodiment of a scan driving circuit SD according to the invention.

Referring to FIG. 7, the scan driving circuit SD includes driving stages ST0 to STn+1.

Each of the driving stages ST0 to STn+1 receives the scan control signal SCS from the driving controller 100 illustrated in FIG. 4. The scan control signal SCS includes a start signal FLM, a first clock signal CLK1, a second clock signal CLK2, and a masking signal. The masking signal may include a first masking signal MS1 and a second masking signal MS2. Each of the driving stages ST0 to STn+1 receives a first voltage VGL and a second voltage VGH. The first voltage VGL and the second voltage VGH may be provided from the voltage generator 300 illustrated in FIG. 4.

The first masking signal MS1 and the second masking signal MS2 may be signals for masking, at predetermined levels, the first scan signals and the second scan signals output from some of the driving stages ST0 to STn+1, namely, the driving stages corresponding to the second display area DA2 (refer to FIG. 1A) during the multi-frequency mode MFM.

In an embodiment, the driving stages ST0 to STn+1 output the first scan signals SC0 to SCn, respectively, and the second scan signals SW0 to SWn+1, respectively. The first scan signals SC0 to SCn may be provided to the first scan lines SL0 to SLn illustrated in FIG. 4, and the second scan signals SW2 to SWn+1 may be provided to the second scan lines SWL2 to SWLn+1 illustrated in FIG. 4.

The display panel DP illustrated in FIG. 4 only includes the second scan lines SWL2 to SWLn+1, and does not include the second scan lines SWL0 and SWL1. Accordingly, the second scan signals SW0 and SW1 output from the driving stages ST0 and ST1 are provided only to the next driving stages ST1 and ST2, respectively, but are not provided to the display panel DP.

The driving stage ST0 may receive the start signal FLM as a carry signal. Each of the driving stages ST1 to STn+1 has a dependent coupling relationship with a previous driving stage such that the second scan signal output from the previous driving stage is received as a carry signal. In an embodiment, the driving stage ST1 receives the second scan signal SW0 output from the previous driving stage ST0 as a carry signal, and the driving stage ST2 receives the second scan signal SW1 output from the previous driving stage ST1 as a carry signal, for example. FIG. 7 illustrates that the j-th second scan signal SWj output from the j-th driving stage STj is provided as a carry signal of the (j+1)-th driving stage (STj+1), but the invention is not limited thereto. In an embodiment, the j-th second scan signal SWj output from the j-th driving stage STj may be provided as a carry signal of the (j+k)-th driving stage (STj+k) (where, j and k are respectively natural numbers).

Figure 8:
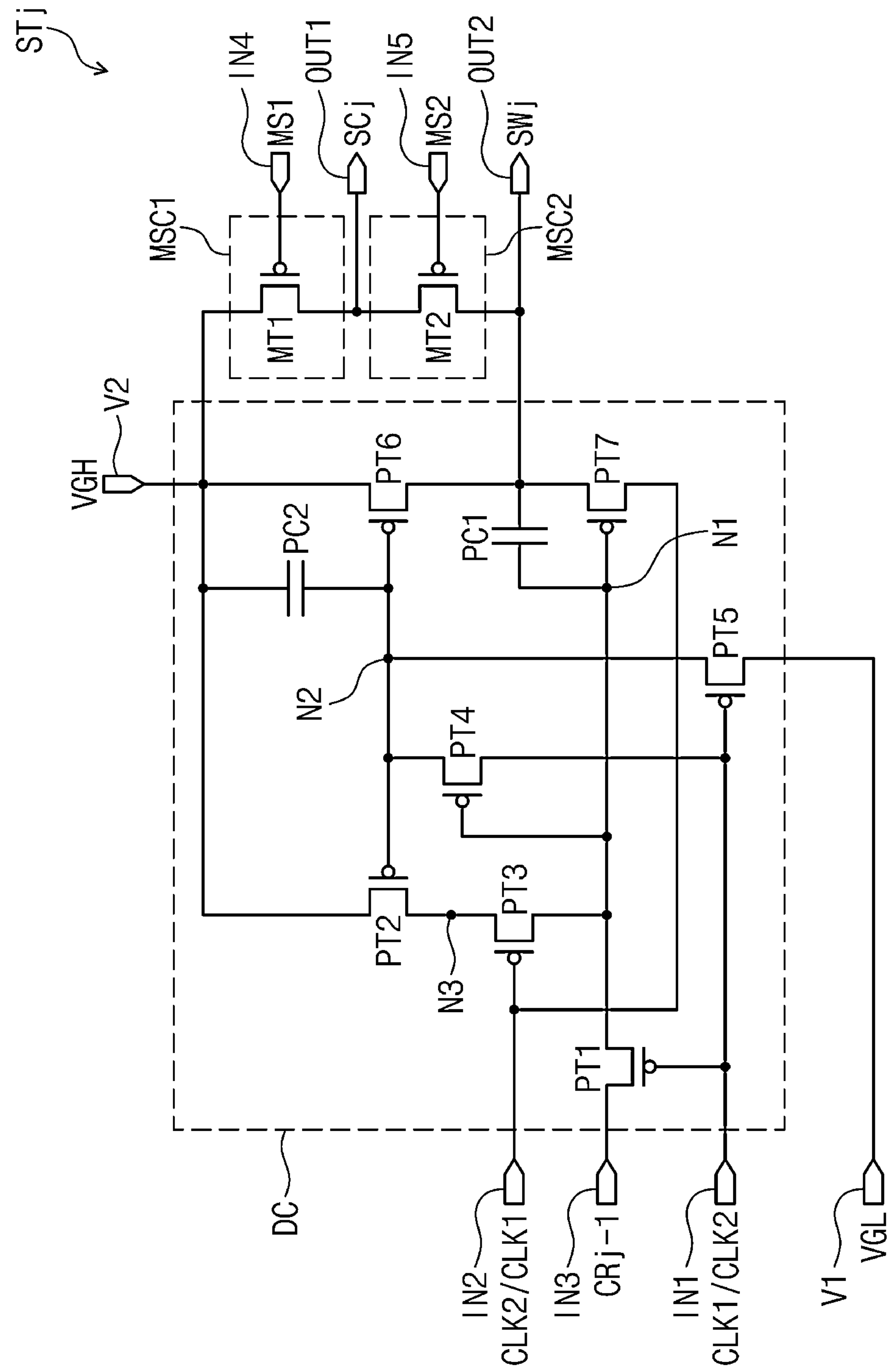
FIG. 8 is a circuit diagram of an embodiment of a j-th driving stage among driving stages illustrated in FIG. 7.

FIG. 8 exemplarily illustrates the j-th driving stage STj (where, j is a positive integer) among the driving stages ST0 to STn+1 illustrated in FIG. 7. Each of the plurality of driving stages ST0 to STn+1 illustrated in FIG. 7 may include the same circuit configuration as the j-th driving stage STj. Hereinafter, the j-th driving stage STj may be also referred to as a driving stage STj.

Referring to FIG. 8, the driving stage STj includes a driving circuit DC, a masking circuit, first to fifth input terminals IN1 to IN5, first and second voltage terminals V1 and V2, and first and second output terminals OUT1 and OUT2. The masking circuit may include a first masking circuit MSC1 and a second masking circuit MSC2.

The driving circuit DC includes transistors PT1 to PT7 and capacitors PC1 and PC2.

The driving circuit DC receives a first clock signal CLK1, a second clock signal CLK2, and a carry signal CRj−1 through the first to third input terminals IN1 to IN3. The driving circuit DC receives the first voltage VGL and the second voltage VGH through the first voltage terminal V1 and the second voltage terminal V2. The driving circuit DC outputs a j-th first scan signal SCj and a j-th second scan signal SWj through the first and second output terminals OUT1 and OUT2, respectively. The j-th second scan signal SWj may be provided to the next driving stage STj+1 as a carry signal CRj. The carry signal CRj−1 received through the third input terminal IN3 may be the (j−1)-th second scan signal SWj−1 output from the previous driving stage STj−1 illustrated in FIG. 7. The carry signal of the driving stage ST0 illustrated in FIG. 7 may be the start signal FLM.

The first input terminal IN1 of each of some driving stages (e.g., odd-numbered driving stages) among the driving stages ST0 to STn+1 illustrated in FIG. 7 receives the first clock signal CLK1 and the second input terminal IN2 of each of the some driving stages (e.g., odd-numbered driving stages) receives the second clock signal CLK2. In addition, the first input terminal IN1 of each of some driving stages (e.g., even-numbered driving stages) among the driving stages ST0 to STn+1 illustrated in FIG. 7 receives the second clock signal CLK2 and the second input terminal IN2 of each of some driving stages (e.g., even-numbered driving stages) receives the first clock signal CLK1.

The transistor PT1 is connected between the third input terminal IN3 and a first node N1, and includes a gate electrode connected to the first input terminal IN1. The transistor PT2 is connected between the second voltage terminal V2 and the third node N3, and includes a gate electrode connected to a second node N2. The transistor PT3 is connected between a third node N3 and the first node N1, and includes a gate electrode connected to the second input terminal IN2.

The transistor PT4 is connected between the second node N2 and the first input terminal IN1, and includes a gate electrode connected to the first node N1. The transistor PT5 is connected between the second node N2 and the first voltage terminal V1, and includes a gate electrode connected to the first input terminal IN1. The transistor PT6 is connected between the second voltage terminal V2 and the second output terminal OUT2, and includes a gate electrode connected to the second node N2. The transistor PT7 is connected between the second output terminal OUT2 and the second input terminal IN2, and includes a gate electrode connected to the first node N1.

The capacitor PC1 is connected between the first node N1 and the second output terminal OUT2. The capacitor PC2 is connected between the second voltage terminal V2 and the second node N2.

The first masking circuit MSC1 includes a first masking transistor MT1. The first masking circuit MSC1 stops (or masks) the output of the first scan signal SCj in response to the first masking signal MS1 received through the fourth input terminal IN4. The first masking transistor MT1 is connected between the second voltage terminal V2 and the first output terminal OUT1, and includes a gate electrode connected to the fourth input terminal IN4.

The second masking circuit MSC2 includes a second masking transistor MT2. The second masking transistor MT2 is connected between the first output terminal OUT1 and the second output terminal OUT2, and includes a gate electrode connected to the fifth input terminal IN5.

Figure 9:
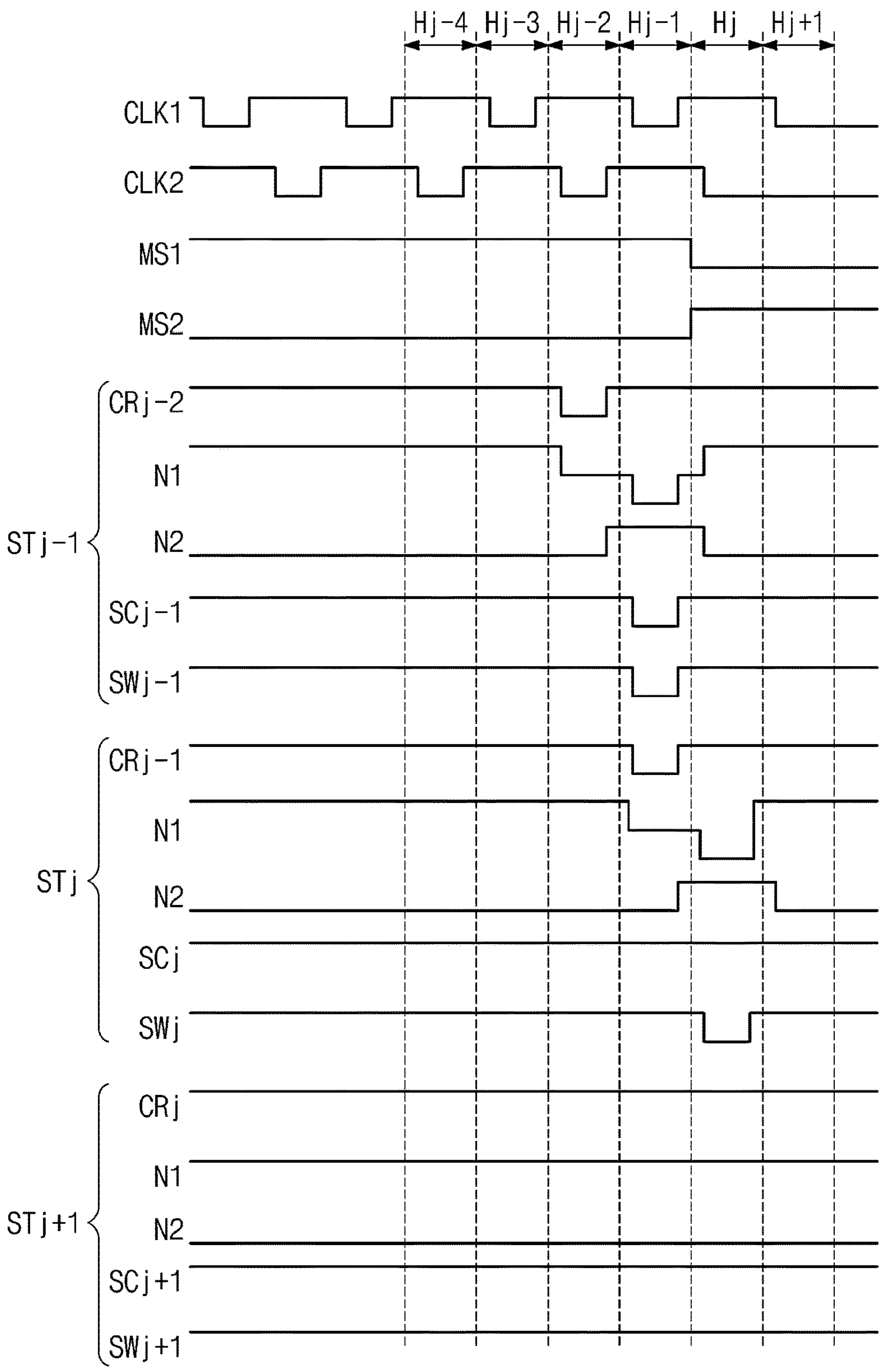
FIG. 9 is a timing diagram of an embodiment of operations of (j−1)-th, j-th and (j+1)-th driving stages in the scan driving circuit illustrated in FIG. 7.

FIG. 9 is a timing diagram of an embodiment of operations of the (j−1)-th driving stage STj−1, the j-th driving stage STj, and the (j+1)-th driving stage STj+1 in the scan driving circuit illustrated in FIG. 7.

Referring to FIGS. 7, 8, and 9, the first clock signal CLK1 and the second clock signal CLK2 have the same frequency as each other, and transit to an active level (e.g., a low level) in different horizontal periods H. The horizontal period H indicates a time during which the pixels PX in one row of the display panel DP (refer to FIG. 4) in the first direction DR1 are driven.

When the first masking signal MS1 has a second level (e.g., a high level), the first masking transistor MT1 is turned off, and thus the second voltage terminal V2 and the first output terminal OUT1 are maintained to be electrically separated from each other. When the second masking signal MS2 has a first level (e.g., the low level), the second masking transistor MT2 is turned on, and thus the first output terminal OUT1 and the second output terminal OUT2 are maintained to be electrically connected to each other.

The (j−1)-th driving stage STj−1 operates as the following.

The (j−1)-th driving stage STj−1 receives the second clock signal CLK2 through the first input terminal IN1, and receives the first clock signal CLK1 through the second input terminal IN2.

When the second clock signal CLK2 received through the first input terminal IN1 in a (j−2)-th horizontal period Hj−2 is at the low level, the transistor PT1 in the driving circuit DC is turned on. As the transistor PT1 is turned on, the carry signal CRj−2 of the low level is delivered to the first node N1 through the transistor PT1. When the second clock signal CLK2 is at the low level, the transistor PT5 is turned on and the second node N2 is discharged to the first voltage VGL. When the second node N2 is at the low level, the transistor PT6 is turned on and the (j−1)-th second scan signal SWj−1 of the high level is output from the second output terminal OUT2. In addition, when the first node N1 is at the low level, the transistor PT7 is turned on and the second output terminal OUT2 is maintained at the high level by the first clock signal CLK1 received through the second input terminal IN2.

When the second clock signal CLK2 is at the high level in the (j−1)-th horizontal period Hj−1, the transistor PT5 is turned off, and the second node N2 becomes at the high level by the transistor PT4 in a turn-on state to turn off the transistor PT6. When the first clock signal CLK1 received through the second input terminal IN2 is at the low level, the first node N1 is changed to be at a lower level via the capacitor PC1, the transistor PT7 is turned on, and then the second output terminal OUT2 may output the (j−1)-th second scan signal SWj−1 of the low level. Since the second masking transistor MT2 is in the turn-on state by the second masking signal MS2 of the low level, the (j−1)-th first scan signal SCj−1 is also activated to the low level. In other words, the (j−1)-th driving stage STj−1 outputs the (j−1)-th first scan signal SCj−1 of the low level and the (j−1)-th second scan signal SWj−1 of the low level in the (j−1)-th horizontal period Hj−1.

When, in the j-th horizontal period Hj, the first masking signal MS1 transits from the high level to the low level and the second masking signal MS2 transits from the low level to the high level, the first masking transistor MT1 in the first masking circuit MSC1 is turned on and the second masking transistor MT2 in the second masking circuit MSC2 is turned off.

The j-th driving stage STj operates as the following.

The j-th driving stage STj receives the first clock signal CLK1 through the first input terminal IN1, and receives the second clock signal CLK2 through the second input terminal IN2.

When the first clock signal CLK1 is at the low level in the (j−1)-th horizontal period Hj−1, the transistor PT1 is turned on. As the transistor PT1 is turned on, the carry signal CRj−1 (namely, the (j−1)-th second scan signal SWj−1) of the low level is delivered to the first node N1 through the transistor PT1. When the first clock signal CLK1 is at the low level, the transistor PT5 is turned on and the second node N2 is discharged to the first voltage VGL. When the second node N2 is at the low level, the transistor PT6 is turned on and the j-th second scan signal SWj of the high level is output from the second output terminal OUT2. In addition, when the first node N1 is at the low level, the transistor PT7 is turned on and the second output terminal OUT2 is maintained at the high level by the second clock signal CLK2 received through the second input terminal IN2.

When the first clock signal CLK1 is at the high level in the j-th horizontal period Hj, the second node N2 becomes at the high level by the transistor PT4 in a turn-on state to turn off the transistor PT6. When the second clock signal CLK2 received through the second input terminal IN2 is at the low level, the first node N1 is changed to be at the lower level via the capacitor PC1, the transistor PT7 is turned on, and then the second output terminal OUT2 may output the j-th second scan signal SWj of a low level. Here, since the second masking transistor MT2 is in a turn-off state by the second masking signal MS2 at the high level and the first masking transistor MT1 is in a turn-on state by the first masking signal MS1 of the low level, the first scan signal SCj is maintained at the high level. In other words, the j-th driving stage STj outputs the first scan signal SCj of the high level and the j-th second scan signal SWj of the low level in the j-th horizontal period Hj.

The (j+1)-th driving stage STj+1 operates as the following.

The (j+1)-th driving stage STj+1 receives the second clock signal CLK2 through the first input terminal IN1, and receives the first clock signal CLK1 through the second input terminal IN2.

When the second clock signal CLK2 received through the first input terminal IN1 is at the low level, the transistor PT1 in the driving circuit DC is turned on. As the transistor PT1 is turned on, the carry signal CRj of the high level is delivered to the first node N1 through the transistor PT1. When the first node N1 is at the high level, the transistors PT3, PT4, and PT7 maintain the turn-off state.

When the second clock signal CLK2 is at the low level in the (j+1)-th horizontal period Hj+1, the transistor PT5 is turned on. The second node N2 is maintained at the low level by the transistor PT5 in the turn-on state, and the transistor PT6 is turned on. Accordingly, the (j+1)-th second scan signal SWj+1 of the high level may be output. Since the first masking transistor MT1 is in the turn-on state by the first masking signal MS1 of the low level, the first scan signal SCj+1 is maintained at the high level. In other words, the (j+1)-th driving stage STj+1 outputs the first scan signal SCj+1 of the high level and the (j+1)-th second scan signal SWj+1 of the high level in the (j+1)-th horizontal period Hj+1.

Figure 10:
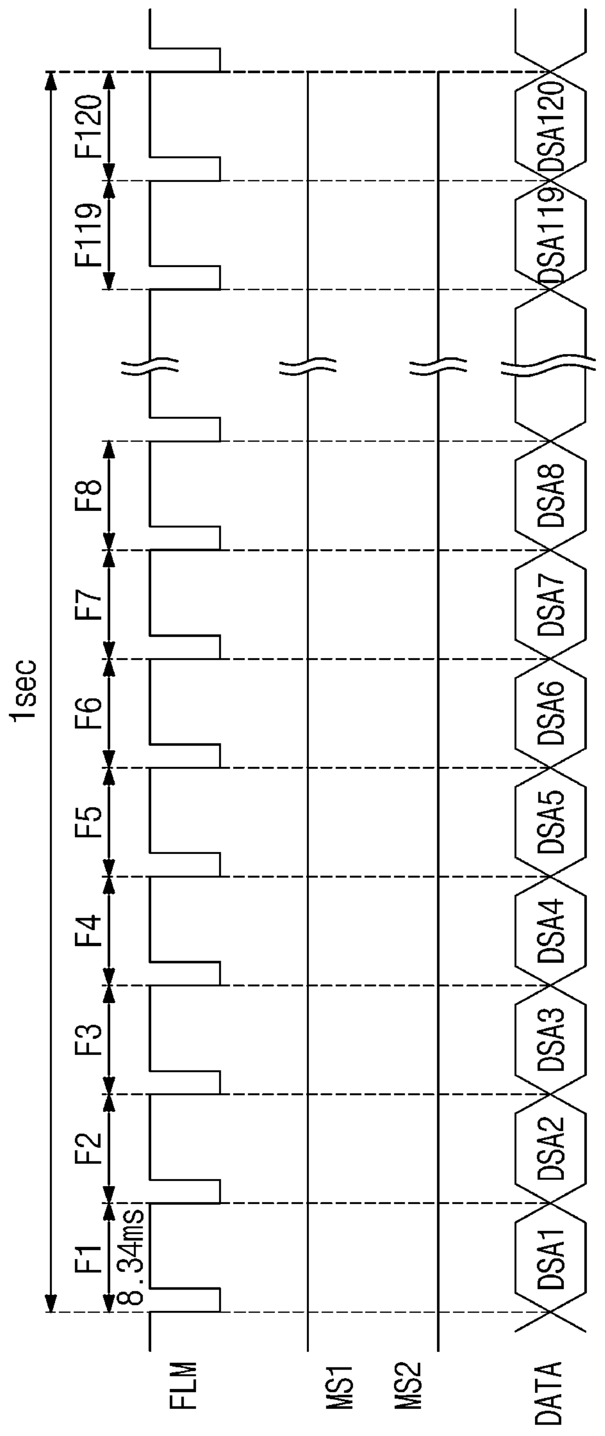
FIG. 10 exemplarily shows signals provided to the scan driving circuit from a driving controller illustrated in FIG. 4 and an image data signal provided to a data driving circuit in the normal frequency mode.

FIG. 10 exemplarily shows signals provided to the scan driving circuit SD from the driving controller 100 illustrated in FIG. 4 and an image data signal DATA provided to the data driving circuit 200 in the normal frequency mode.

Referring to FIGS. 4, 7, and 10, the start signal FLM in the normal frequency mode NFM is activated to the low level 120 times per second. In other words, the start signal FLM is activated to the low level at the start time of every frame from a first frame F1 to a 120-th frame F120. The first masking signal MS1 may be maintained at the high level during the normal frequency mode NFM, and the second masking signal MS2 may be maintained at the low level. The duration of one frame in the normal frequency mode NFM may be a first duration (e.g., 8.34 ms).

The driving controller 100 may sequentially provide a data signal DSA1 corresponding to the first frame F1 to a data signal DSA120 corresponding to the 120-th frame F120 to the data driving circuit 200 as the image data signal DATA.

Figure 11:
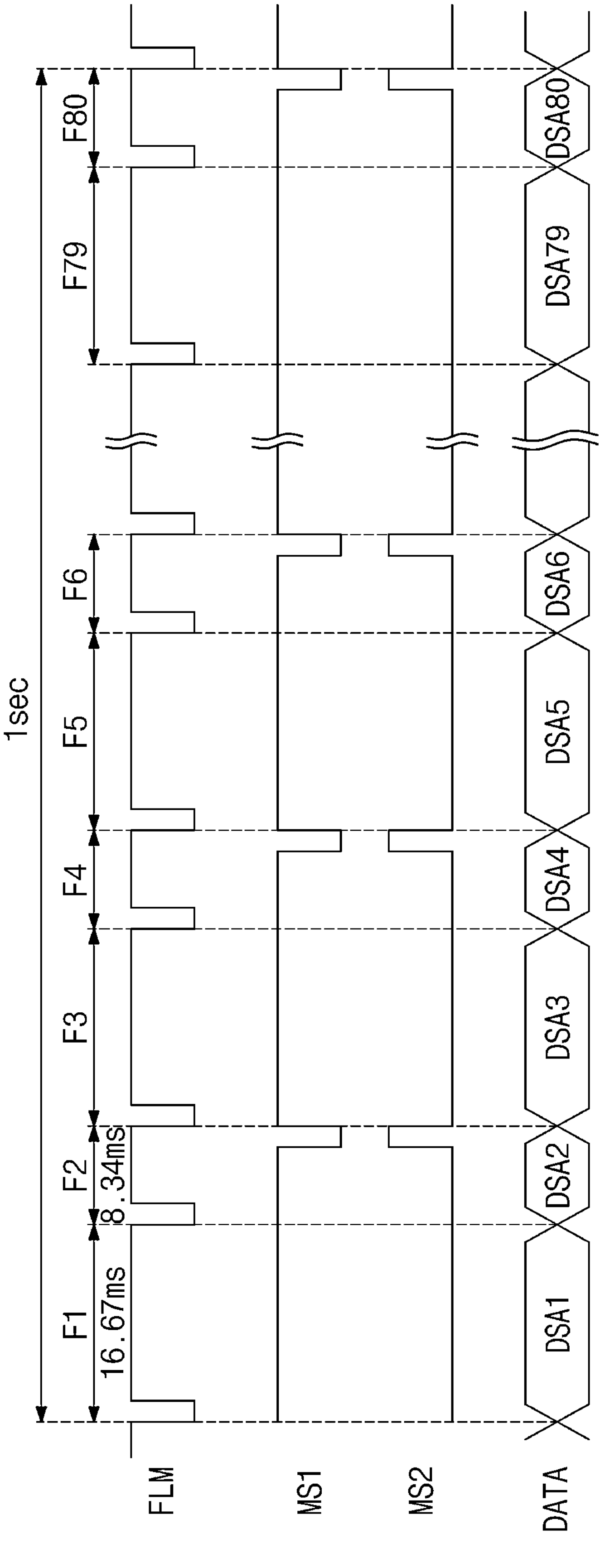
FIG. 11 exemplarily shows signals provided to the scan driving circuit from the driving controller illustrated in FIG. 4 and an image data signal provided to the data driving circuit in the multi-frequency mode.

FIG. 11 exemplarily illustrates signals provided from the driving controller 100 to the scan driving circuit SD illustrated in FIG. 4 and the image data signal DATA provided to the data driving circuit 200, when, in the multi-frequency mode MFM, the first driving frequency of the first display area DA1 (refer to FIG. 1A) is 80 Hz and the second driving frequency of the second display area DA2 (refer to FIG. 1A) is 40 Hz.

Referring to FIGS. 4, 7, and 11, the display device DD in the multi-frequency mode MFM makes the basic driving frequency (BDF) lower than the normal frequency (NF). In an embodiment, when the normal frequency (NF) is 120 Hz, the basic driving frequency (BDF) is 60 Hz, for example. When the basic driving frequency (BDF) is 60 Hz, the duration of one frame is 16.67 milliseconds (ms). The display device DD may display images on the first display area DA1 (refer to FIG. 1) and the second display area DA2 (refer to FIG. 1) of the display panel DP during the duration (16.67 ms) corresponding to the basic driving frequency (BDF) in the full frame of the multi-frequency mode MFM, and display an image on the first display area DA1 of the display panel DP during the duration (e.g., 8.34 ms) lower than the basic driving frequency (BDF) in a half frame. In the full frame, images are displayed on both the first display area DA1 and the second display area DA2, and in the half frame, an image is displayed only on the first display area DA1.

As illustrated in FIG. 11, when in the multi-frequency mode MFM, the first driving frequency of the first display area DA1 (refer to FIG. 1A) is 80 Hz and the second driving frequency of the second display area DA2 (refer to FIG. 1A) is 40 Hz, the start signal FLM is activated at the low level 80 times per second. In other words, the start signal FLM is activated to the low level at the start time of every frame from a first frame F1 to an 80-th frame F80.

When the first driving frequency of the first display area DA1 (refer to FIG. 1A) is 80 Hz, and the second driving frequency of the second display area DA2 (refer to FIG. 1A) is 40 Hz, the duration of each of odd-numbered frames F1, F3, F5, . . . , and F79 and the duration of each of even-numbered frames F2, F4, F6, . . . , and F80 are different from each other. In an embodiment, the duration of each of the odd-numbered frames F1, F3, F5, . . . , and F79 is 16.67 ms, and the duration of each of the even-numbered frames F2, F4, F6, . . . , and F80 is 8.34 ms, for example. In other words, the duration of the first frame F1 in the multi-frequency mode MFM is the same as a first duration (e.g., 16.67 ms) that is the duration of the basic driving frequency (BDF), and the duration of the second frame F2 consecutive to the first frame is a second duration shorter than the first duration.

When, in the multi-frequency mode MFM, the first driving frequency is 80 Hz and the second driving frequency is 40 Hz, for one second, the first image IM1 is displayed in the first frame F1 to the 80-th frame F80 in the first display area DA1, and the second image IM2 may be displayed in the odd-numbered frames F1, F3, . . . , and F79 among the first frame F1 to the 80-th frame F80 in the second display area DA2. In other words, the second image IM2 is not displayed in the second display area DA2 in the even-numbered frames F2, F4, . . . , and F80.

When it is assumed that a k-th driving stage STk among the driving stages ST0 to STn+1 in the scan driving circuit SD corresponds to the start position of the second display area DA2, the first masking signal MS1 may transit to the low level and the second masking signal MS2 may transit to the high level so as to mask the first scan signals SCk to SCn and the second scan signals SWk+1 to SWn+1 output from the driving stages STk to STn+1 in the even-numbered frames F2, F4, . . . , and F80 of the multi-frequency mode. The driving stages STk to STn+1 may not activate the first scan signals SCk to SCn and the second scan signals SWk+1 to STn+1 to the low level in response to the first masking signal MS1 of the low level and the second masking signal MS2 of the high level. When the even-numbered frame (e.g., F2) ends and the next odd-numbered frame (e.g., F3) starts, the first masking signal MS1 transits to the high level and the second masking signal MS2 transits to the low level to prepare a new frame.

Figure 12:
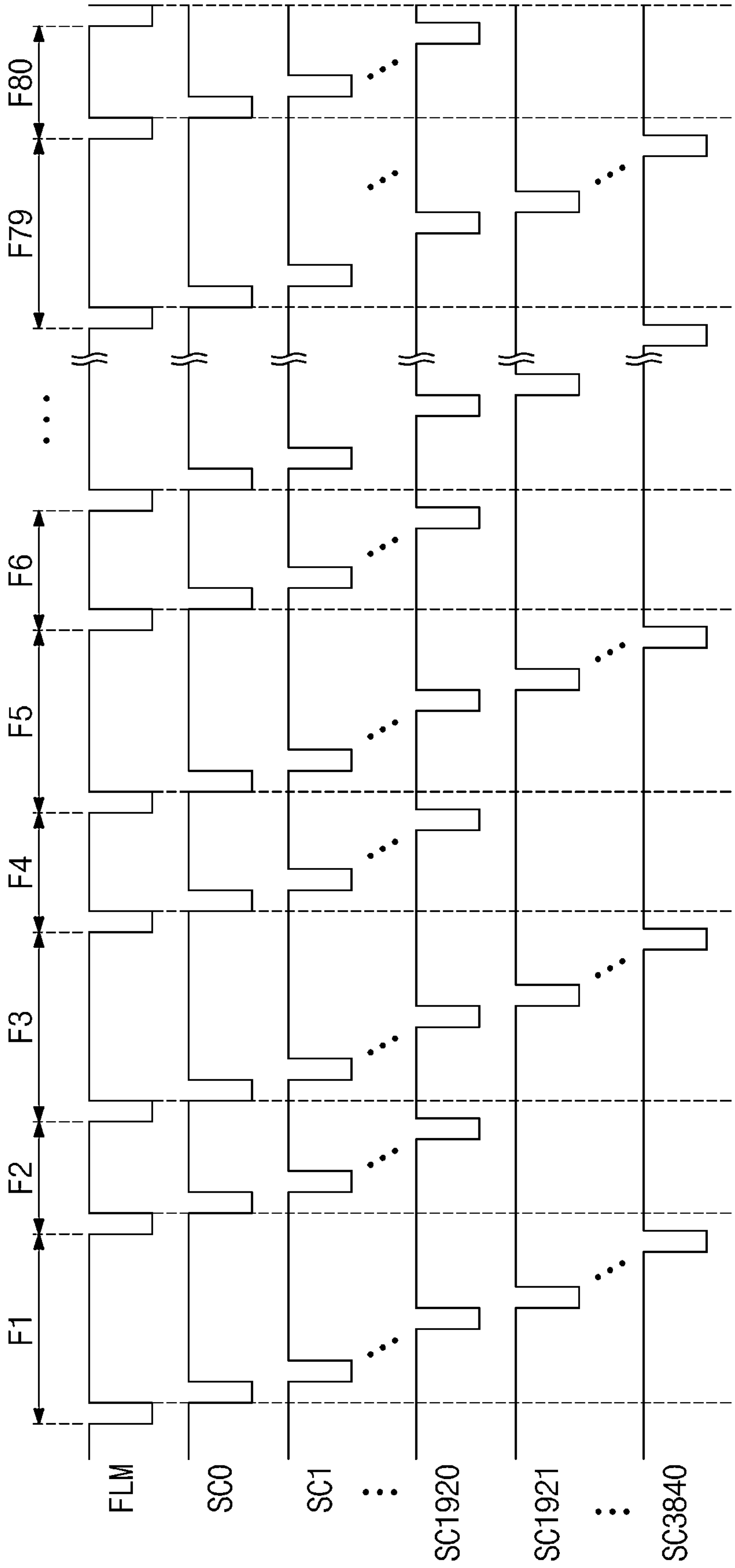
FIG. 12 exemplarily shows first scan signals output from the scan driving circuit in the multi-frequency mode.

FIG. 12 exemplarily shows the first scan signals output from the scan driving circuit SD in the multi-frequency mode.

FIG. 12 exemplarily illustrates first scan signals SC0 to SC3840 output from the scan driving circuit SD illustrated in FIG. 7, when, in the multi-frequency mode MFM, the first driving frequency of the first display area DA1 (refer to FIG. 1A) is 80 Hz and the second driving frequency of the second display area DA2 (refer to FIG. 1A) is 40 Hz.

It is assumed that the first display area DA1 illustrated in FIG. 1A includes pixels of a 0-th row to a 1920-th row, and the second display area DA2 includes pixels of a 1921-th row to a 3840-th row.

Referring to FIGS. 4, 7, and 12, the start signal FLM in the multi-frequency mode MFM is activated to the low level 80 times per second. In other words, the start signal FLM is activated to the low level in every frame from the first frame F1 to the 80-th frame F80.

When the first driving frequency of the first display area DA1 (refer to FIG. 1A) is 80 Hz, and the second driving frequency of the second display area DA2 (refer to FIG. 1A) is 40 Hz, the duration of each of odd-numbered frames F1, F3, F5, . . . , and F79 is 16.67 ms and the duration of each of even-numbered frames F2, F4, F6, . . . , and F80 is 8.34 ms.

The driving stages ST0 to STn in the scan driving circuit SD in the odd-numbered frames F1, F3, F5, . . . , and F79 of the multi-frequency mode MFM may sequentially output the first scan signals SC0 to SCn.

When it is assumed that a 1921-th driving stage ST1921 among the driving stages ST0 to ST3840 in the scan driving circuit SD corresponds to the start position of the second display area DA2, the driving stages ST0 to ST1920 sequentially activate the first scan signals SC0 to SC1920 to the low level in the even-numbered frames F2, F4, F6, . . . , and F80 of the multi-frequency mode MFM, and the driving stages ST1921 to ST3840 maintain the first scan signals SC1921 at the high level.

In this way, the driving stages ST0 to ST1920 corresponding to the first display area DA1 among the driving stages ST0 to ST3840 in the scan driving circuit SD sequentially operate for every frame, and the first image IM1 may be displayed in the first display area DA1. The driving stages ST1921 to ST3840 corresponding to the second display area DA2 among the driving stages ST0 to ST3840 in the scan driving circuit SD sequentially operate only in some frames (e.g., odd-numbered frames F1, F3, and F5), and the second image IM2 may be displayed on the second display area DA2. In addition, the driving stages ST1921 to ST3840 corresponding to the second display area DA2 among the driving stages ST0 to ST3840 in the scan driving circuit SD do not operate in some frames (e.g., even-numbered frames F2, F4, F6, . . . , F80), and thus the power consumption may be reduced.

Figure 13:
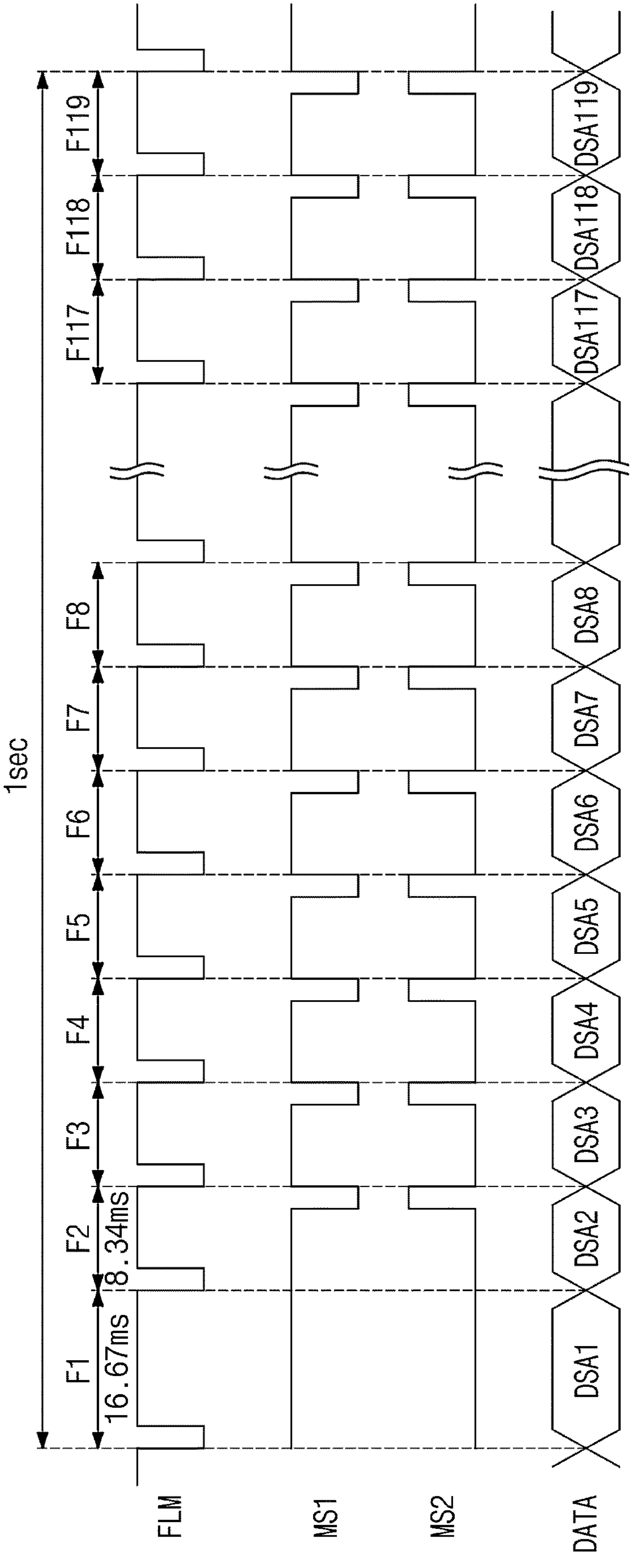
FIGS. 13 to 15 exemplarily show signals provided to the scan driving circuit from the driving controller illustrated in FIG. 4 and the image data signal provided to the data driving circuit in the multi-frequency mode.

FIG. 13 exemplarily illustrates signals provided from the driving controller 100 to the scan driving circuit SD illustrated in FIG. 4 and the image data signal DATA provided to the data driving circuit 200, when, in the multi-frequency mode MFM, the first driving frequency of the first display area DA1 (refer to FIG. 1A) is 119 Hz and the second driving frequency of the second display area DA2 (refer to FIG. 1A) is 1 Hz.

Referring to FIGS. 4, 7, and 13, the start signal FLM in the multi-frequency mode MFM is activated to the low level 119 times per second. In other words, the start signal FLM is activated to the low level in every frame from the first frame F1 to a 119-th frame F119.

When the first driving frequency of the first display area DA1 (refer to FIG. 1A) is 119 Hz, and the second driving frequency of the second display area DA2 (refer to FIG. 1A) is 1 Hz, the duration of the first frame F1 and the duration of each of other frames F2 to F119 are different from each other. In an embodiment, the duration of the first frame F1 is 16.67 ms, and the duration of each of the second to the 119-th frame F2 to F119 is 8.34 ms, for example.

When it is assumed that a k-th driving stage STk among the driving stages ST0 to STn+1 in the scan driving circuit SD corresponds to the start position of the second display area DA2, the first masking signal MS1 may transit to the low level and the second masking signal MS2 may transit to the high level so as to mask the first scan signals SCk to SCn and the second scan signals SWk to SWn+1 output from the driving stages STk to STn+1 in the frames F2 to F119 of the multi-frequency mode. The driving stages STk to STn+1 may maintain the first scan signals SC0 to SCn and the second scan signals SW0 to SWn+1 to the high level in response to the first masking signal MS1 of the low level and the second masking signal MS2 of the high level. In an embodiment, when the second frame F2 ends and the third frame F3 starts, the first masking signal MS1 transits to the high level and the second masking signal MS2 transits to the low level to prepare a new frame, for example.

During the multi-frequency mode MFM, the display device DD may set the basic driving frequency (BDF) to 60 Hz that is lower than 120 Hz, which is the normal frequency (NF). The following Table 2 exemplarily shows the power consumption in terms of milliwatt (mW) according to the driving frequency of the display device DD.

TABLE 2

| Driving frequency | Still image | Moving image |
|---|---|---|
| 120 Hz | 528.1 mW | 538.9 mW |
| 60 Hz | 304.4 mW | 336.2 mW |

As recognized from Table 2, when a still image or a moving image is displayed on both of the first display area DA1 and the second display area DA2 of the display device DD, the driving frequency is lowered from 120 Hz to 60 Hz, which results reduction in the power consumption.

In addition, as illustrated in FIG. 13, when the first driving frequency DF1 of the first display area DA1 in which a moving image is displayed is set to 119 Hz, and the second driving frequency (DF2) of the second display area DA2 in which a still image is displayed is set to 1 Hz, the degradation of display quality may be minimized. In other words, the power consumption may be reduced without degradation of the display quality of the image displayed on the display panel DP.

Figure 14:
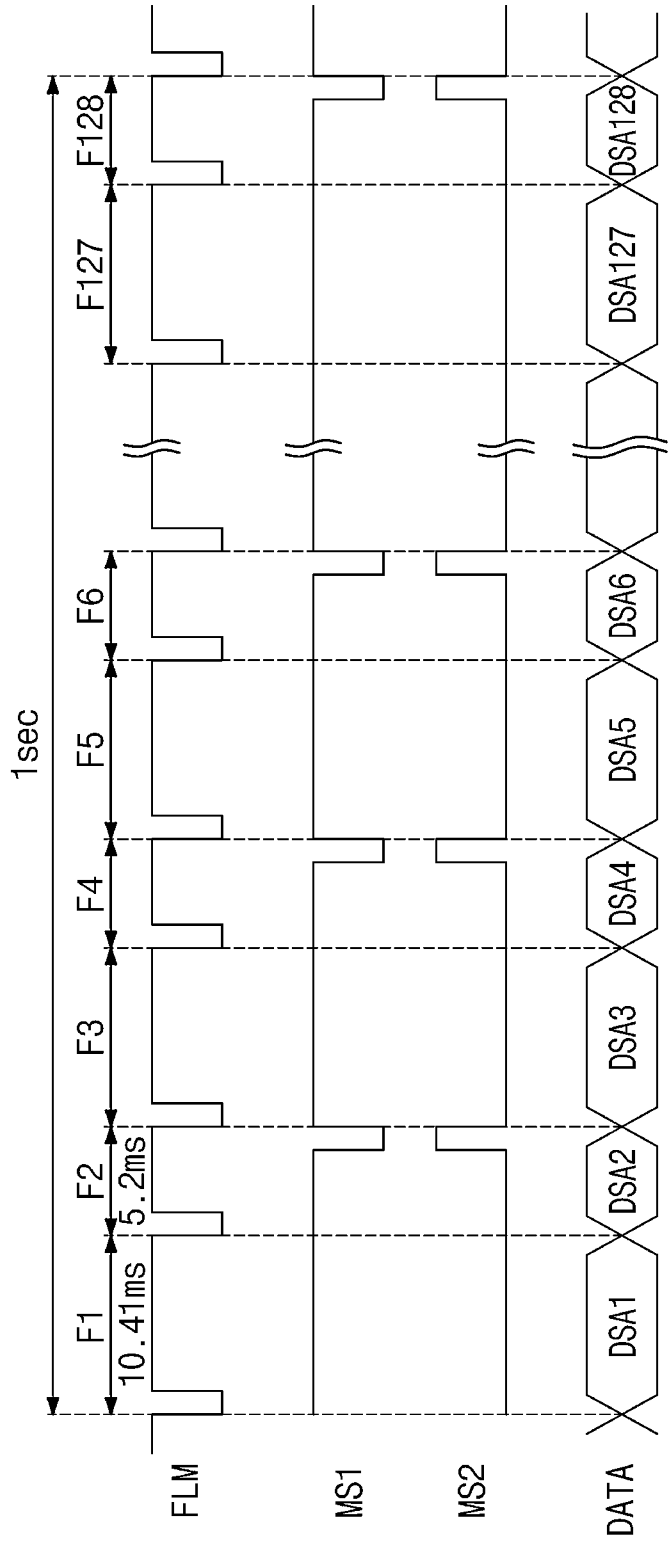

FIG. 14 exemplarily illustrates signals provided from the driving controller 100 to the scan driving circuit SD illustrated in FIG. 4 and the image data signal DATA provided to the data driving circuit 200, when, in the multi-frequency mode MFM, the first driving frequency of the first display area DA1 (refer to FIG. 1A) is 128 Hz and the second driving frequency of the second display area DA2 (refer to FIG. 1A) is 64 Hz.

Referring to FIGS. 4, 7, and 14, the display device DD in the multi-frequency mode MFM makes the basic driving frequency (BDF) lower than the normal frequency (NF). In an embodiment, when the normal frequency (NF) is 120 Hz, the basic driving frequency (BDF) is 96 Hz, for example. When the basic driving frequency (BDF) is 96 Hz, the duration of one frame is 10.41 ms. The display device DD may display images in the first display area DA1 (refer to FIG. 1) and the second display area DA2 (refer to FIG. 1) of the display panel DP during the duration (10.41 ms) corresponding to the basic driving frequency (BDF) in the full frame of the multi-frequency mode MFM, and display an image in the first display area DA1 of the display panel DP during the duration (e.g., 5.2 ms) lower than the basic driving frequency (BDF) in a half frame. The full frame is a frame in which the images are displayed in both of the first display area DA1 and the second display area DA2, and the half frame is a frame in which the image is displayed only in the first display area DA1.

As illustrated in FIG. 14, when, in the multi-frequency mode MFM, the first driving frequency of the first display area DA1 (refer to FIG. 1A) is 128 Hz and the second driving frequency of the second display area DA2 (refer to FIG. 1A) is 64 Hz, the start signal FLM is activated to the low level 128 times per second. In other words, the start signal FLM is activated to the low level at the start time of every frame from a first frame F1 to a 128-th frame F128.

When the first driving frequency of the first display area DA1 (refer to FIG. 1A) is 128 Hz, and the second driving frequency of the second display area DA2 (refer to FIG. 1A) is 64 Hz, the duration of each of odd-numbered frames F1, F3, F5, . . . , and F127 and the duration of each of even-numbered frames F2, F4, F6, . . . , and F128 are different from each other. In an embodiment, the duration of each of the odd-numbered frames F1, F3, F5, . . . , and F127 is 10.41 ms, and the duration of each of the even-numbered frames F2, F4, F6, . . . , and F128 is 5.2 ms, for example. In other words, the duration of the first frame F1 in the multi-frequency mode MFM is the same as a first duration (e.g., 10.41 ms) that is the duration of the basic driving frequency (BDF), and the duration of the second frame F2 consecutive to the first frame is a second duration shorter than the first duration.

When, in the multi-frequency mode MFM, the first driving frequency is 128 Hz and the second driving frequency is 64 Hz, for one second, the first image IM1 is displayed in the first frame F1 to the 128-th frame F128 in the first display area DA1, and the second image IM2 may be displayed in the odd-numbered frames F1, F3, . . . , and F127 among the first frame F1 to the 128-th frame F128 in the second display area DA2. In other words, the second image IM2 is not displayed in the second display area DA2 in the even-numbered frames F2, F4, . . . , and F128.

When it is assumed that a k-th driving stage STk among the driving stages ST0 to STn+1 in the scan driving circuit SD corresponds to the start position of the second display area DA2, the first masking signal MS1 may transit to the low level and the second masking signal MS2 may transit to the high level in order to mask the first scan signals SCk to SCn and the second scan signals SWk+1 to SWn+1 output from the driving stages STk to STn+1 in the even-numbered frames F2, F4, . . . , and F128 of the multi-frequency mode. The driving stages STk to STn+1 may not activate the first scan signals SCk to SCn and the second scan signals SWk+1 to SWn+1 to the low level in response to the first masking signal MS1 of the low level and the second masking signal MS2 of the high level. When the even-numbered frame (e.g., F2) ends and the next odd-numbered frame (e.g., F3) starts, the first masking signal MS1 transits to the high level and the second masking signal MS2 transits to the low level to prepare a new frame.

Figure 15:
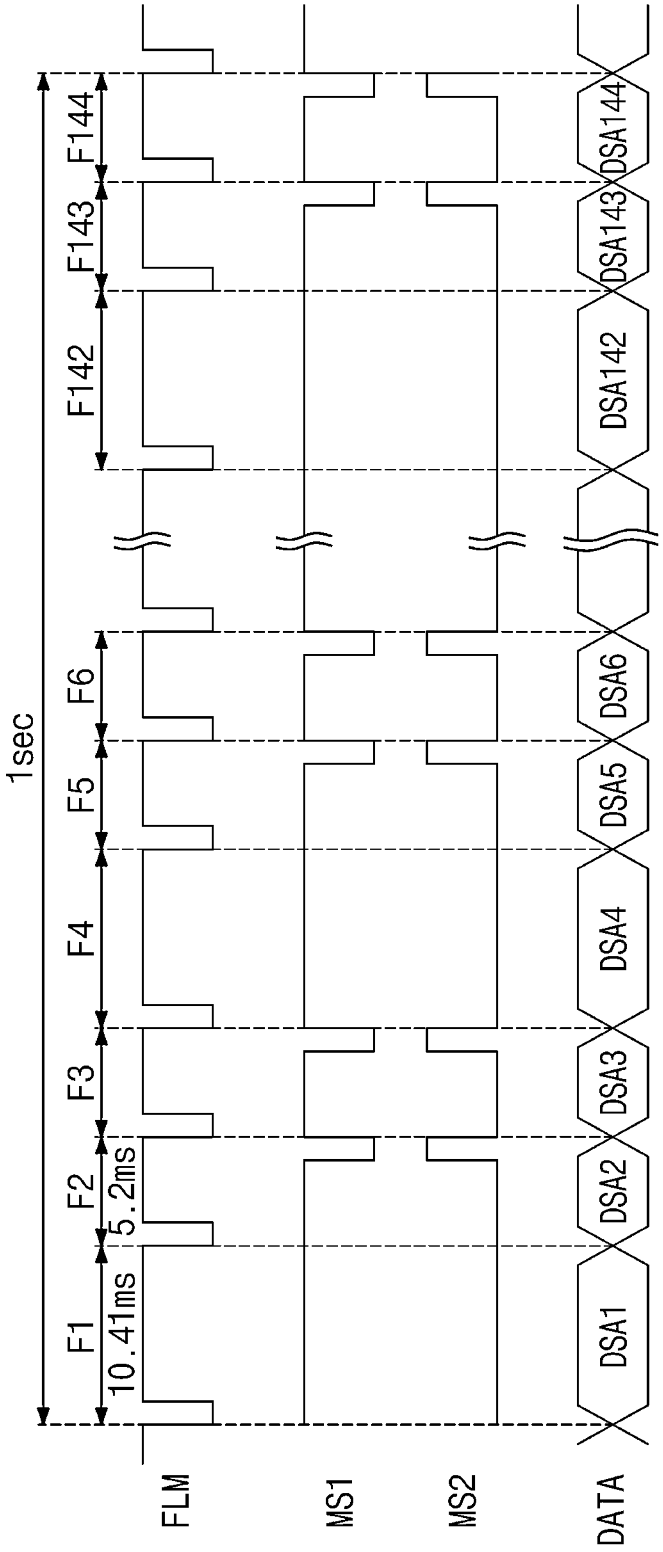

FIG. 15 exemplarily illustrates signals provided from the driving controller 100 to the scan driving circuit SD illustrated in FIG. 4 and the image data signal DATA provided to the data driving circuit 200, when, in the multi-frequency mode MFM, the first driving frequency of the first display area DA1 (refer to FIG. 1A) is 144 Hz and the second driving frequency of the second display area DA2 (refer to FIG. 1A) is 30 Hz.

Referring to FIGS. 4, 7, and 15, the display device DD in the multi-frequency mode MFM makes the basic driving frequency (BDF) lower than the normal frequency (NF). In an embodiment, when the normal frequency (NF) is 120 Hz, the basic driving frequency (BDF) is 96 Hz, for example. When the basic driving frequency (BDF) is 96 Hz, the duration of one frame is 10.41 ms. The display device DD may display images in the first display area DA1 (refer to FIG. 1) and the second display area DA2 (refer to FIG. 1) of the display panel DP during the duration (10.41 ms) corresponding to the basic driving frequency (BDF) in the full frame of the multi-frequency mode MFM, and display an image in the first display area DA1 of the display panel DP during the duration (e.g., 5.2 ms) lower than the basic driving frequency (BDF) in a half frame. The full frame is a frame in which the images are displayed in both the first display area DA1 and the second display area DA2, and the half frame is a frame in which the image is displayed only in the first display area DA1.

As illustrated in FIG. 15, when, in the multi-frequency mode MFM, the first driving frequency of the first display area DA1 (refer to FIG. 1A) is 144 Hz and the second driving frequency of the second display area DA2 (refer to FIG. 1A) is 30 Hz, the start signal FLM is activated to the low level 144 times per second. In other words, the start signal FLM is activated to the low level at the start time of every frame from a first frame F1 to a 144-th frame F144.

When the first driving frequency of the first display area DA1 (refer to FIG. 1A) is 144 Hz and the second driving frequency of the second display area DA2 (refer to FIG. 1A) is 30 Hz, the duration of the first frame F1 and the duration of each of other frames F2 to F144 are different from each other. In an embodiment, the duration of the first frame F1 is 10.41 ms, and the duration of each of the second to the 144-th frame F2 to F144 is 5.2 ms, for example.

During the multi-frequency mode MFM, the display device DD may reduce the power consumption by setting the basic driving frequency (BDF) to 96 Hz lower than 120 Hz that is the normal frequency (NF).

In addition, when the first driving frequency (DF1) of the first display area DA1 in which a moving image is displayed is set to 144 Hz, and the second driving frequency (DF2) of the second display area DA2 in which a still image is displayed is set to 30 Hz, the degradation of display quality may be minimized. In other words, the power consumption may be reduced without degradation of the display quality of an image displayed on the display panel DP.

Figure 16:
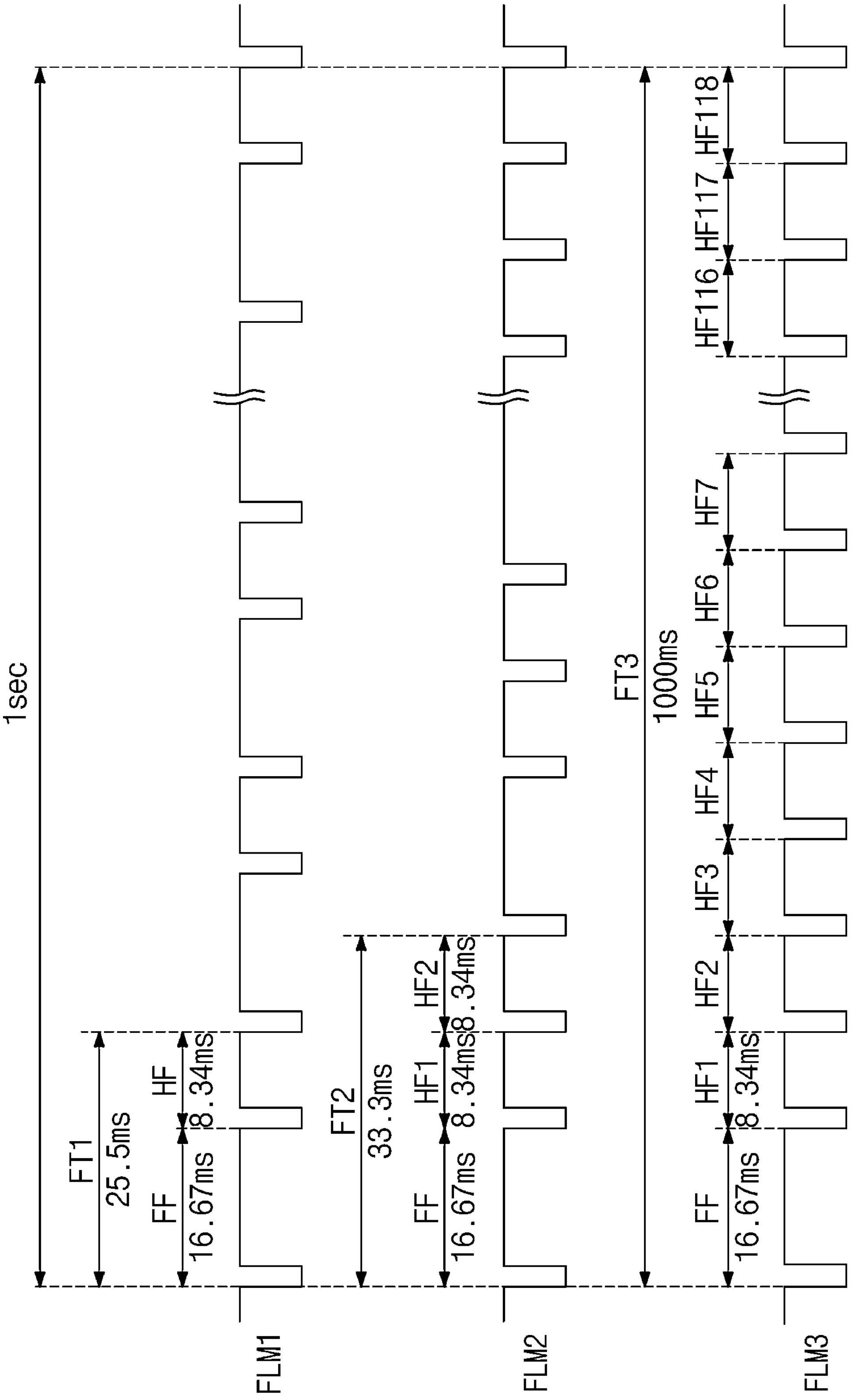
FIG. 16 exemplarily shows start signals provided to the scan driving circuit from the driving controller illustrated in FIG. 4 in the multi-frequency mode.

FIG. 16 exemplarily shows start signals to be provided to the scan driving circuit SD from the driving controller 100 illustrated in FIG. 4 in the multi-frequency mode.

When the normal frequency is 120 Hz, the basic driving frequency in the multi-frequency mode MFM may be set to 60 Hz. When the basic driving frequency (BDF) is 60 Hz, the duration of a full frame FF is 16.67 ms, and the duration of a half frame HF is 8.34 ms. The full frame FF is a frame in which the first display area DA1 (refer to FIG. 1A) and the second display area DA2 (refer to FIG. 1A) are all driven, and the half frame HF is a frame in which only the first display area DA1 is driven.

The period FT1 of the start signal FLM1 includes one full frame FF and one half frame HF, and the duration thereof is 25.5 ms.

The first driving frequency (DF1) of the first display area DA1 may be calculated as the following Equation 1.

$$DF1=1000\ ms/((FFT+HFT)/(1+HFN)) \quad (1)$$

The second driving frequency (DF2) of the second display area DA2 may be calculated as the following Equation 2.

$$DF2=1000\ ms/(FFT+HFT) \quad (2)$$

In Equations 1 and 2, FFT denotes the duration of the full frame FF, HFT denotes the duration of the half frame HF, and HFN denotes the number of the half frames HF in the period FT1.

Since the basic driving frequency is 60 Hz, the duration of the full frame FF in the period FT1 of the start signal FLM1 is 16.67 ms, the duration of the half frame HF is 8.34 ms, and the number of half frames HF is 1, the first driving frequency (DF1) of the first display area DA1 is 1000 ms/((16.67 ms+8.34 ms)/(1+1))=80 Hz, and the second driving frequency (DF2) of the second display area DA2 is 1000 ms/(16.67 ms+8.34 ms)=40 Hz.

The period FT2 of the start signal FLM2 includes one full frame FF and two half frames HF1 and HF2, and the duration thereof is 33.3 ms.

Since the basic driving frequency is 60 Hz, the duration of the full frame FF in the period FT2 of the start signal FLM2 is 16.67 ms, the duration of the half frame HF is 16.48 ms, and the number of half frames HF is 2, the first driving frequency (DF1) of the first display area DA1 is 1000 ms/((16.67 ms+16.68 ms)/(1+2))=90 Hz, and the second driving frequency (DF2) of the second display area DA2 is 1000 ms/(16.67 ms+16.68 ms)=30 Hz.

The period FT3 of the start signal FLM3 includes one full frame FF and 118 half frames, HF1, HF2, . . . , and HF118, and the duration thereof is 1000 ms.

Since the basic driving frequency is 60 Hz, the duration of the full frame FF in the period FT3 of the start signal FLM3 is 16.67 ms, the duration of the half frames HF is 8.34 ms, and the number of half frames HF1, HF2, . . . , and HF118 is 118, the first driving frequency (DF1) of the first display area DA1 is 1000 ms/((16.67 ms+983.32 ms)/(1+118))=119 Hz, and the second driving frequency (DF2) of the second display area DA2 is 1000 ms/(16.67 ms+983.32 ms)=1 Hz.

The following Table 3 exemplarily shows the first driving frequency (DF1) of the first display area DA1 and the second driving frequency (DF2) of the second display area DA2 according to the number of the half frames HF in the period of the start signal FLM, when the basic driving frequency (BDF) is 60 Hz and the ratio of the length of the first display area DA1 to the length of the second display area DA2 in the second direction DR2 is 1:1. Table 3 shows a calculation result when it is assumed that the basic driving frequency (BDF) is 60 Hz, the duration of the full frame is 16.66 ms, and the duration of the half frame HF is 8.33 ms.

TABLE 3

| Number of half frames (HF) | First driving frequency (DF1) | Second driving frequency (DF2) |
|---|---|---|
| 0 | 60 Hz | 60 Hz |
| 1 | 80.03 Hz | 40.02 Hz |
| 2 | 90.04 Hz | 30.01 Hz |
| 3 | 96.04 Hz | 24.01 Hz |
| 10 | 110.04 Hz | 10 Hz |

TABLE 3-continued

| Number of half frames (HF) | First driving frequency (DF1) | Second driving frequency (DF2) |
|---|---|---|
| 20 | 114.59 Hz | 5.46 Hz |
| 118 | 119.05 Hz | 1 Hz |

The following Table 4 exemplarily shows the first driving frequency (DF1) of the first display area DA1 and the second driving frequency (DF2) of the second display area DA2 according to the number of the half frames in the period of the start signal FLM, when the basic driving frequency (BDF) is 96 Hz and the ratio of the length of the first display area DA1 to the length of the second display area DA2 in the second direction DR2 is 1:1. Table 4 shows a calculation result when it is assumed that the basic driving frequency (BDF) is 96 Hz, the duration of the full frame is 10.41 ms, and the duration of the half frame HF is 5.2 ms.

TABLE 4

| Number of half frames (HF) | First driving frequency (DF1) | Second driving frequency (DF2) |
|---|---|---|
| 0 | 96 Hz | 96 Hz |
| 1 | 128 Hz | 64 Hz |
| 2 | 144 Hz | 48 Hz |
| 4 | 160 Hz | 32 Hz |
| 6 | 168 Hz | 24 Hz |
| 10 | 176 Hz | 16 Hz |
| 18 | 183 Hz | 10 Hz |
| 118 | 191 Hz | 2 Hz |

The following Table 5 exemplarily shows the first driving frequency (DF1) of the first display area DA1 and the second driving frequency (DF2) of the second display area DA2 according to the number of the half frames in the period of the start signal FLM, when the basic driving frequency (BDF) is 120 Hz and a ratio of the length of the first display area DA1 to the length of the second display area DA2 in the second direction DR2 is 1:1. Table 5 shows a calculation result when it is assumed that the basic driving frequency (BDF) is 120 Hz, the duration of the full frame is 8.34 ms, and the duration of the half frame HF is 4.17 ms.

TABLE 5

| Number of half frames (HF) | First driving frequency (DF1) | Second driving frequency (DF2) |
|---|---|---|
| 0 | 120 Hz | 120 Hz |
| 1 | 160 Hz | 80 Hz |
| 2 | 180 Hz | 60 Hz |
| 4 | 200 Hz | 40 Hz |
| 6 | 210 Hz | 30 Hz |
| 10 | 220 Hz | 20 Hz |
| 20 | 228 Hz | 11 Hz |
| 238 | 238 Hz | 1 Hz |

A display device having such a configuration may drive a display panel at a lower driving frequency than a normal frequency to reduce the power consumption, and drive, at different frequencies, a first display area in which a moving image is displayed and a second display area in which a still image is displayed. In particular, a first driving frequency for the first display area in which the moving image is displayed is made higher than a second driving frequency for the second display area in which the still image is displayed, and thus the power consumption may be reduced while degradation in display quality of the moving image may be minimized.

Although the embodiments of the invention have been described, it is understood that the invention should not be limited to these embodiments but various changes and modifications may be made by one ordinary skilled in the art within the spirit and scope of the invention as hereinafter claimed. In addition, embodiments disclosed in the inventive concept are not intended to limit the technical spirit of the inventive concept, and the protection scope of the present invention should be interpreted based on the following appended claims and it should be appreciated that all technical spirits included within a range equivalent thereto are included in the protection scope of the invention.

Although the embodiments of the invention have been described, it is understood that the invention should not be limited to these embodiments but various changes and modifications may be made by one ordinary skilled in the art within the spirit and scope of the invention as hereinafter claimed.

What is claimed is:

1. A display device comprising:

a display panel comprising a plurality of pixels respectively connected to a plurality of data lines and a plurality of scan lines;

a data driving circuit which drives the plurality of data lines;

a scan driving circuit which drives the plurality of scan lines in response to a start signal and a masking signal; and a driving controller which receives an image signal and a control signal and output the start signal for indicating a start of one frame and the masking signal, wherein the driving controller divides the display panel into a first display area and a second display area during a multi-frequency mode, wherein the start signal comprises a first frame having a first duration and a second frame consecutive to the first frame having a second duration during the multi-frequency mode, the second duration is shorter than the first duration, and the masking signal indicates a start of the second display area, and wherein the start signal comprises a third frame having a third duration during a single-frequency mode, the first duration is longer than the third duration, wherein the driving controller provides image data signals corresponding to the first display area and the second display area to the data driving circuit during the first frame of the multi-frequency mode, and provides an image data signal corresponding to the first display area to the data driving circuit during the second frame of the multi-frequency mode.

2. The display device of claim 1, wherein driving controller outputs the start signal and the masking signal so that the first display area operates at a first driving frequency and the second display area operates at a second driving frequency lower than the first driving frequency when an operation mode is the multi-frequency mode.

3. The display device of claim 2, wherein driving controller outputs the start signal and the masking signal so that the display panel operates at a basic driving frequency when the operation mode is a single-frequency mode, wherein the first driving frequency is higher than the basic driving frequency.

4. The display device of claim 1, wherein the second duration of the second frame during the multi-frequency mode is equal to the third duration of the third frame during the single-frequency mode.

5. The display device of claim 1, wherein the driving controller provides image data signals corresponding to the first display area and the second display area to the data driving circuit in every frame during the single-frequency mode.

6. The display device of claim 1, wherein the scan driving circuit comprises a plurality of driving stages which respectively drives corresponding scan lines among the plurality of scan lines, wherein each of the plurality of driving stages comprises:

a driving circuit which outputs a first scan signal to a first output terminal in response to clock signals from the driving controller and a carry signal; and a masking circuit which stops the driving circuit to output the first scan signal in response to the masking signal.

7. The display device of claim 6, wherein a first driving stage among the plurality of driving stages receives the start signal as the carry signal.

8. The display device of claim 7, wherein the driving circuit outputs a second scan signal to a second output terminal in response to the clock signals and the carry signal.

9. The display device of claim 8, wherein, among the plurality of driving stages, the second scan signal output from a j-th driving stage is provided to a (j+k)-th driving stage as the carry signal, where j and k are respectively natural numbers.

10. The display device of claim 8, wherein the masking signal comprises a first masking signal and a second masking signal, wherein the masking circuit comprises:

a first masking circuit which electrically connects a first voltage terminal and the first output terminal in response to the first masking signal; and a second masking circuit which electrically connects the first output terminal and the second output terminal in response to the second masking signal.

11. The display device of claim 10, wherein the first masking circuit electrically connects the first voltage terminal and the first output terminal in response to the first masking signal during the multi-frequency mode, and the second masking circuit electrically disconnects the first output terminal and the second output terminal in response to the second masking signal during the multi-frequency mode.

12. A driving controller comprising:

a controller which:

receives an image signal and a control signal, divides a display panel into a first display area and a second display area during a multi-frequency mode, and outputs a start signal for indicating a start of one frame and a masking signal for indicating a start of the second display area, wherein the start signal comprises a first frame having a first duration and a second frame consecutive to the first frame having a second duration during the multi-frequency mode, the second duration is shorter than the first duration, and wherein the start signal comprises a third frame having a third duration during a single-frequency mode, the first duration is longer than the third duration, wherein the controller outputs image data signals corresponding to the first display area and the second display area during the first frame of the multi-frequency mode, and provides an image data signal corresponding to the first display area to a data driving circuit during the second frame of the multi-frequency mode.

13. The driving controller of claim 12, wherein the controller outputs the start signal and the masking signal so that the first display area operates at a first driving frequency and the second display area operates at a second driving frequency lower than the first driving frequency when an operation mode is the multi-frequency mode.

14. The driving controller of claim 13, wherein the controller outputs the start signal and the masking signal so that the display panel operates at a basic driving frequency when the operation mode is a single-frequency mode, wherein the first driving frequency is higher than the basic driving frequency.

15. The driving controller of claim 12, wherein the second duration of the second frame during the multi-frequency mode is equal to a third duration of one frame during the single-frequency mode.

16. The driving controller of claim 12, wherein the controller outputs image data signals corresponding to the first display area and the second display area in every frame during the single-frequency mode.

* * * * *